(12) United States Patent
Rudy et al.

(10) Patent No.: US 10,829,347 B2
(45) Date of Patent: *Nov. 10, 2020

(54) OPTICAL DETECTION SYSTEM FOR LIFT CRANE

(71) Applicant: Manitowoc Crane Companies, LLC, Manitowoc, WI (US)

(72) Inventors: John R. Rudy, Greencastle, PA (US); Matthew Thoresen, Chambersburg, PA (US); Ingo Schiller, Alexandria, VA (US)

(73) Assignee: Manitowoc Crane Companies, LLC, Manitowoc, WI (US)

( * ) Notice: Subject to any disclaimer, the term of this patent is extended or adjusted under 35 U.S.C. 154(b) by 182 days.

This patent is subject to a terminal disclaimer.

(21) Appl. No.: 15/819,573

(22) Filed: Nov. 21, 2017

(65) Prior Publication Data

US 2018/0141789 A1 May 24, 2018

Related U.S. Application Data

(60) Provisional application No. 62/425,449, filed on Nov. 22, 2016.

(51) Int. Cl.
*B66C 13/16* (2006.01)
*B66C 23/36* (2006.01)
(Continued)

(52) U.S. Cl.
CPC .............. *B66C 13/16* (2013.01); *B66C 13/18* (2013.01); *B66C 13/46* (2013.01); *B66C 13/48* (2013.01);
(Continued)

(58) Field of Classification Search
CPC ......... B66C 13/06; B66C 13/16; B66C 13/18; B66C 13/46; B66C 13/48; B66C 23/36;
(Continued)

(56) References Cited

U.S. PATENT DOCUMENTS 4,216,868 A 8/1980 Geppert
4,577,344 A 3/1986 Warren et al.
(Continued)

FOREIGN PATENT DOCUMENTS

AU 637377 B 10/1993
AU 2015372216 A1 7/2016
(Continued)

OTHER PUBLICATIONS

European Search Report issued by ISA/EPO in connection with EP17153446 dated Jul. 7, 2017.
(Continued)

*Primary Examiner* — Atul Trivedi
(74) *Attorney, Agent, or Firm* — Levenfeld Pearlstein, LLC

(57) ABSTRACT

A crane includes a carrier, a superstructure mounted on the carrier and including a boom, a cable extending from the boom, a lifting appliance coupled to the cable, and an optical detection system. The optical detection system includes an image capture device configured to capture an image, and an optical detection computer configured to detect one or more objects in the captured image, the one or more objects selected from: the lifting appliance, the cable, a load coupled to the lifting appliance, an object remote from the crane and a marker. The computer is also configured to analyze the one or more detected objects and determine a condition of a crane component based on the analysis of the one or more detected objects. Methods of determining the condition of the crane component and controlling crane operation are also included.

20 Claims, 14 Drawing Sheets

(51) Int. Cl.

| | | |
|---|---|---|
| *B66C 15/06* | (2006.01) | |
| *G06T 7/00* | (2017.01) | |
| *G06T 7/73* | (2017.01) | |
| *G06T 7/13* | (2017.01) | |
| *B66C 13/46* | (2006.01) | |
| *B66C 13/18* | (2006.01) | |
| *G06T 7/60* | (2017.01) | |
| *G06T 7/70* | (2017.01) | |
| *G01B 11/26* | (2006.01) | |
| *B66C 13/48* | (2006.01) | |
| *B66C 23/42* | (2006.01) | |
| *B66C 13/06* | (2006.01) | |

(52) U.S. Cl.
CPC ............ *B66C 15/06* (2013.01); *B66C 15/065* (2013.01); *B66C 23/36* (2013.01); *B66C 23/42* (2013.01); *G01B 11/26* (2013.01); *G06T 7/0004* (2013.01); *G06T 7/13* (2017.01); *G06T 7/60* (2013.01); *G06T 7/70* (2017.01); *G06T 7/74* (2017.01); *B66C 13/06* (2013.01); *G06T 2207/30164* (2013.01); *G06T 2207/30204* (2013.01); *G06T 2207/30242* (2013.01)

(58) Field of Classification Search
CPC ....... B66C 23/42; B66C 15/06; B66C 15/065; G01B 11/26; G06T 7/0004; G06T 7/13; G06T 7/60; G06T 7/70; G06T 7/74; G06T 2207/30164; G06T 2207/30204; G06T 2207/30242
USPC .......................................................... 701/50
See application file for complete search history.

(56) References Cited

U.S. PATENT DOCUMENTS

| | | |
|---|---|---|
| 4,826,391 A | 5/1989 | Lawrence et al. |
| 4,907,768 A | 3/1990 | Masseron et al. |
| 5,251,768 A | 10/1993 | Yoshimatsu et al. |
| 5,392,935 A | 2/1995 | Kazama et al. |
| 5,642,822 A | 7/1997 | Monzen et al. |
| 5,645,181 A | 7/1997 | Ichiba et al. |
| 5,726,907 A | 5/1998 | Davidson et al. |
| 5,967,347 A | 10/1999 | Miyata et al. |
| 6,065,619 A | 5/2000 | Miyata et al. |
| 6,140,930 A | 10/2000 | Shaw |
| 6,170,681 B1 | 1/2001 | Yoshimatsu |
| 6,182,843 B1 | 2/2001 | Tax et al. |
| 6,256,553 B1 | 7/2001 | Erikkila |
| 6,554,144 B2 | 4/2003 | Hashiguchi et al. |
| 6,568,547 B1 | 5/2003 | Kretschmer et al. |
| 6,588,610 B2 | 7/2003 | Ong et al. |
| 6,634,112 B2 | 10/2003 | Carr et al. |
| 6,718,048 B1 | 4/2004 | Kawata et al. |
| 6,748,104 B1 | 6/2004 | Bachelder et al. |
| 6,765,224 B1 | 7/2004 | Favreau et al. |
| 6,894,621 B2 | 5/2005 | Shaw |
| 7,106,883 B2 | 9/2006 | Uchida et al. |
| 7,121,012 B2 | 10/2006 | Voecks |
| 7,289,875 B2 | 10/2007 | Recktenwald et al. |
| 7,289,876 B2 | 10/2007 | Lussen et al. |
| 7,310,431 B2 | 12/2007 | Gokturk et al. |
| 7,472,009 B2 | 12/2008 | Baldwin |
| 7,599,762 B2 | 10/2009 | Discenzo et al. |
| 7,648,036 B2 | 1/2010 | Recktenwald et al. |
| 7,656,459 B2 | 2/2010 | Catanzaro |
| 7,936,143 B2 | 5/2011 | Ikeguchi et al. |
| 7,950,539 B2 | 5/2011 | Henriksson |
| 8,005,598 B2 | 8/2011 | Terashima et al. |
| 8,267,264 B2 | 9/2012 | Bryfors et al. |
| 8,272,521 B1 | 9/2012 | Kemmerly et al. |
| 8,385,594 B2 | 2/2013 | Hofmann et al. |
| 8,504,253 B2 | 8/2013 | Stantchev et al. |
| 8,618,949 B2 | 12/2013 | Maynard et al. |
| 8,659,408 B2 | 2/2014 | Taylor et al. |
| 8,682,541 B2 | 3/2014 | Best et al. |
| 8,937,651 B2 | 1/2015 | Guissin et al. |
| 9,156,663 B2 | 10/2015 | Roeben et al. |
| 9,278,834 B2 | 3/2016 | Pech et al. |
| 9,300,954 B2 | 3/2016 | Tanizumi et al. |
| 9,335,318 B2 | 5/2016 | Ilaka et al. |
| 9,394,146 B2 | 7/2016 | Schroder |
| 9,440,824 B2 | 9/2016 | Stuehrwoldt et al. |
| 9,556,006 B2 | 1/2017 | Schneider et al. |
| 2003/0137590 A1 | 7/2003 | Barnes et al. |
| 2003/0161524 A1 | 8/2003 | King |
| 2005/0192732 A1 | 9/2005 | Narisawa et al. |
| 2005/0226584 A1 | 10/2005 | Williams et al. |
| 2005/0232626 A1 | 10/2005 | Schulte et al. |
| 2010/0070179 A1 | 3/2010 | Cameron |
| 2010/0189226 A1* | 7/2010 | Kotowski ............ G01V 5/0008 378/198 |
| 2010/0277298 A1 | 11/2010 | Leong et al. |
| 2011/0031202 A1 | 2/2011 | Pech et al. |
| 2011/0140419 A1 | 6/2011 | Stockner |
| 2011/0187548 A1 | 8/2011 | Maynard et al. |
| 2011/0272376 A1 | 11/2011 | Jung et al. |
| 2013/0013251 A1* | 1/2013 | Schoonmaker ......... B66C 13/46 702/152 |
| 2013/0119256 A1 | 5/2013 | Husmann et al. |
| 2013/0345857 A1 | 12/2013 | Lee et al. |
| 2014/0224755 A1 | 8/2014 | Eriksson et al. |
| 2015/0122761 A1 | 5/2015 | Ford et al. |
| 2015/0130375 A1* | 5/2015 | Sutherland ............... B66C 13/14 318/380 |
| 2015/0142277 A1 | 5/2015 | Eriksson et al. |
| 2015/0217455 A1* | 8/2015 | Kikkeri ................ B25J 9/1676 700/259 |
| 2015/0226369 A1* | 8/2015 | Troy ........................ B66C 13/48 180/2.1 |
| 2015/0256797 A1 | 9/2015 | Torben |
| 2015/0329333 A1 | 11/2015 | Fenker |
| 2015/0344271 A1* | 12/2015 | Schneider ................ B66C 13/08 212/273 |
| 2016/0006947 A1 | 1/2016 | Kowatari et al. |
| 2016/0016763 A1 | 1/2016 | Lee et al. |
| 2016/0031681 A1 | 2/2016 | Delplace |
| 2016/0031683 A1* | 2/2016 | Fenker ..................... B66C 13/46 212/276 |
| 2016/0035251 A1* | 2/2016 | Delplace ............... G09B 19/003 434/66 |
| 2016/0107866 A1 | 4/2016 | Schoonmaker et al. |
| 2016/0119589 A1 | 4/2016 | Tanizumi et al. |
| 2016/0176686 A1 | 6/2016 | Schoonmaker |
| 2016/0236913 A1 | 8/2016 | Ilaka et al. |
| 2017/0217737 A1 | 8/2017 | Rudy et al. |
| 2018/0044149 A1 | 2/2018 | Weckbecker et al. |
| 2018/0072540 A1 | 3/2018 | Stangl |
| 2018/0141787 A1 | 5/2018 | Rudy et al. |
| 2018/0141789 A1* | 5/2018 | Rudy ....................... B66C 13/16 |
| 2018/0143011 A1 | 5/2018 | Rudy et al. |
| 2018/0209156 A1* | 7/2018 | Pettersson ............... B66C 13/48 |
| 2018/0252921 A1* | 9/2018 | Rantala .................... B66C 17/00 |
| 2019/0112165 A1* | 4/2019 | Palberg ................... B66C 13/063 |
| 2019/0150357 A1* | 5/2019 | Wu .......................... G06T 7/0004 |
| 2019/0177131 A1* | 6/2019 | Palberg ................... B66C 13/40 |
| 2019/0270624 A1* | 9/2019 | Sembo .................... B66C 13/22 |
| 2019/0276281 A1* | 9/2019 | Hofmeister ........... G06F 3/0484 |
| 2020/0198939 A1* | 6/2020 | Kosaka ................... B66C 13/22 |

FOREIGN PATENT DOCUMENTS

| | | |
|---|---|---|
| CN | 2154484 Y | 1/1994 |
| CN | 102193559 A | 9/2011 |
| CN | 102661952 A | 9/2012 |
| CN | 102795547 A | 11/2012 |
| CN | 103398668 A | 11/2013 |
| CN | 203319435 U | 12/2013 |
| CN | 102756976 B | 7/2014 |
| CN | 104477723 A | 4/2015 |
| CN | 104535356 A | 4/2015 |

(56) References Cited

FOREIGN PATENT DOCUMENTS

| | | |
|---|---|---|
| CN | 105668419 A | 6/2016 |
| DE | 102006046469 A1 | 4/2008 |
| DE | 102013008348 A1 | 11/2014 |
| DE | 102014018063 A1 | 6/2016 |
| EP | 2383566 A1 | 11/2011 |
| EP | 2722302 A1 | 4/2014 |
| EP | 2914540 B1 | 9/2015 |
| EP | 2899496 A1 | 8/2016 |
| JP | 2056397 A | 2/1990 |
| JP | H0256397 A | 2/1990 |
| JP | H08157188 A | 6/1996 |
| JP | 2003300692 A | 10/2003 |
| JP | 2008074594 A | 4/2008 |
| JP | 2009073248 A | 4/2009 |
| JP | 2010241548 A | 10/2010 |
| JP | 2013120176 A | 6/2013 |
| JP | 2013193825 A | 9/2013 |
| JP | 2015101470 A | 6/2015 |
| JP | 2015229582 A | 12/2015 |
| JP | 2016166086 A | 9/2016 |
| JP | 2016166091 A | 9/2016 |
| JP | 2017186163 A | 10/2017 |
| JP | 2017186164 A | 10/2017 |
| JP | 2017186165 A | 10/2017 |
| WO | 9119665 A1 | 2/1991 |
| WO | 1999008956 A1 | 2/1999 |
| WO | 2004080882 A1 | 9/2004 |
| WO | 2009047719 A2 | 4/2009 |
| WO | 2013059599 A1 | 4/2013 |
| WO | 2014019132 A1 | 2/2014 |
| WO | 2014047840 A1 | 4/2014 |
| WO | 2016101500 A1 | 6/2016 |
| WO | 2017067651 A1 | 4/2017 |
| WO | 2017159321 A1 | 9/2017 |
| WO | 2018160119 A1 | 9/2018 |

OTHER PUBLICATIONS

"360 degree vehicle camera systems", https://www.vdo-instruments.com/camera-systems/360-degree-vehicle-camera-systems.html, captured Oct. 9, 2017.
"ProViu ASL 360", http://www.asl360.co.uk/products/, captured Oct. 9, 2017.
Extended European Search Report issued by EPO in connection with EP17203098 dated Apr. 17, 2018.
Extended European Search Report issued by EPO in connection with EP17203102 dated Apr. 18, 2018.
Extended European Search Report issued by EPO in connection with EP17203093 dated Apr. 18, 2018.
Extended European Search Report issued by EPO in connection with EP17203109 dated May 4, 2018.
Vallan A, Molinari F. A vision-based technique for lay length measurement of metallic wire ropes. IEEE Trans Instrum Meas 2009; 58. (Year: 2009).
Extended European Search Report issued by EPO in connection with EP Appl. 19207783.2 dated Mar. 31, 2020.

* cited by examiner

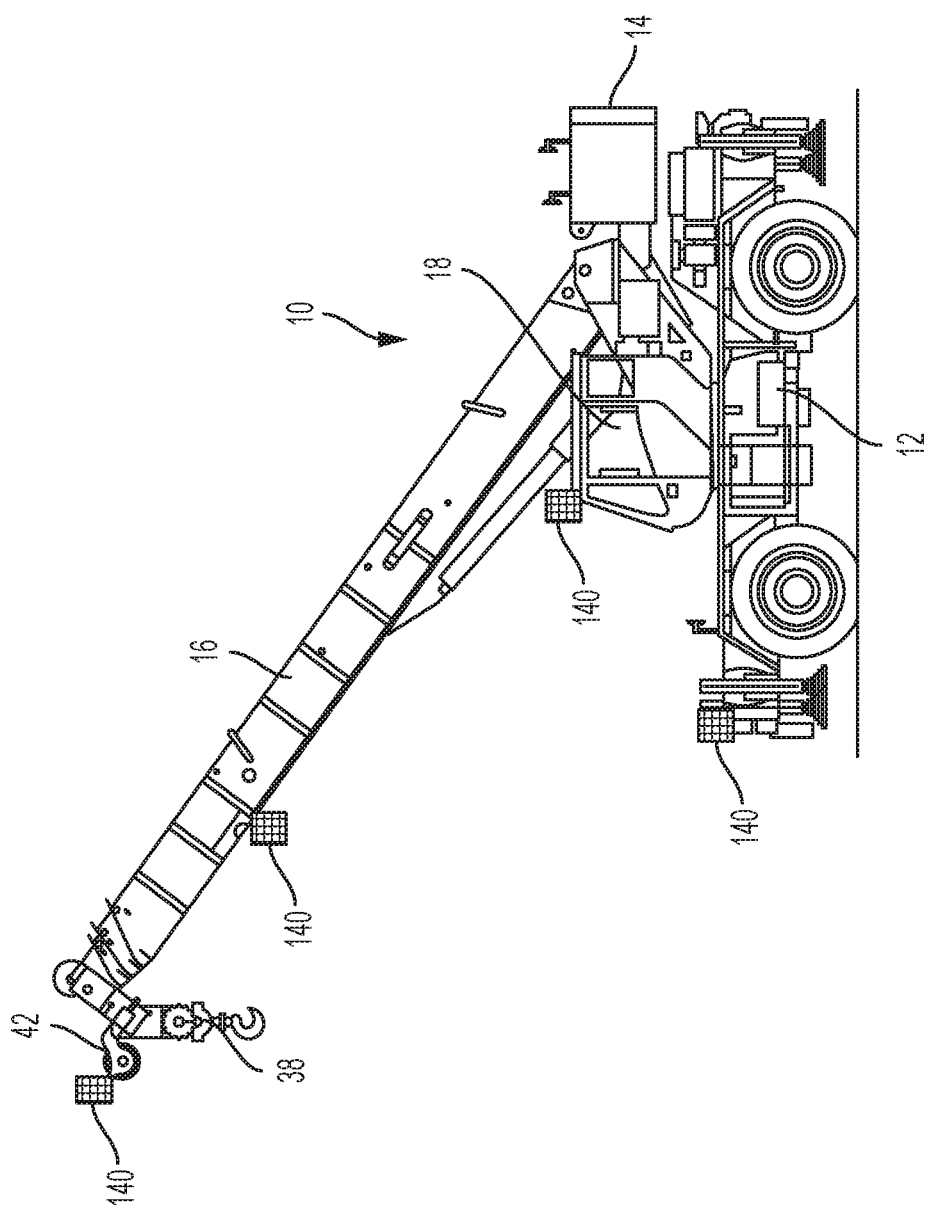

OPTICAL DETECTION SYSTEM FOR LIFT CRANE

BACKGROUND

The following description relates to lifting vehicles, for example, a crane, having an optical detection and trajectory analysis system.

Lift cranes may be controlled to undergo a variety of movements during operation. For example, a lift crane may generally include carrier unit and superstructure rotatably mounted to the carrier unit. The superstructure includes a boom that is rotatable on a vertical axis of the crane with the superstructure to produce a left or right swiveling movement, rotatable on a horizontal axis to produce a boom up (lifting) or boom down (lowering) movement, and extendable or retractable along a boom axis in a telescoping movement. In addition, a hoist may be operated to reel in or payout a cable to raise or lower a load.

Careful attention must be paid during operation of the lift crane to avoid undesirable conditions. One undesirable condition is commonly referred to as two blocking. Two blocking occurs when a lower block, such as a lifting hook or lifting hook block, attached to the cable, is raised to a point where it comes into contact with the boom nose sheave, an upper block or another portion of the boom. This contact may increase stresses in certain structural elements of the crane which may affect performance and result in an unstable condition.

Sensors may be used to identify or detect situations where two blocking may, or already has occurred. One such sensor is a contact or proximity sensor disposed at or near the boom tip. The sensor can detect the presence of the lower block when the lower block moves into contact with the sensor. Another sensor for detecting a two block situation may be a non-contact sensor that senses the approach of the lower block by, for example, acoustic wave energy or infrared sensors. However, these two block detecting sensors are positioned on moving parts and are subject to mechanical interference and impacts, and may not be suitably durable for extended use.

Another undesirable condition is a swinging load or lower block. This may occur when a load is connected to the lower block and is suspended from the ground surface during a lifting operation. Swinging may result from inertia when moving the boom, vibrations, wind, or other similar forces. Typically, to resolve a swinging load, the crane operator may attempt to swivel the boom or keep the boom steady until the swinging has been reduced. However, this process can be time consuming and require a great deal of operator skill.

Still another undesirable condition occurs when the condition of a cable deteriorates or the crane operator is not aware of the type of cable being used in a lifting operation. For example, under regular wear and tear, a cable may begin to fray. Currently, the cable condition is detected by visual inspection. However, in some conditions, a cable condition may deteriorate faster than expected, and may go undetected until an inspection. In addition, a visual inspection is subject to human error. In other examples, a type of cable may not be readily apparent to the operator. For example, it may not be apparent to the operator whether the cable is synthetic, rope, or other type of material or construction. The type of cable affects the lift parameters, such as load limits.

Undesirable conditions may also arise when hazards or potential obstructions are in the vicinity of a crane, and in particular, within a potential lifting zone or travel path of the boom and/or load. Currently, the crane operator may rely on communications with a spotter observing movement of the crane and the load. However, such observations and communications may be imprecise and are subject to human error.

Another system, described in U.S. patent application Ser. No. 14/974,812 and commonly owned with the instant application, has been developed where a 3D spatial workspace of an area surrounding a crane is modeled. In such a system, coordinate data representing a worksite and obstacle data representing a forbidden volume is stored in a memory. Boom data representing a location of the boom is also stored in the memory. The system limits movement of the boom to avoid the boom from entering the forbidden volume, based on coordinate data, obstacle data and boom data. However, in such a system, a 3D modeling of the workspace is performed before the crane is operated for normal use.

Accordingly, it is desirable to provide a system and method for optically detecting an object, and determining a condition of a crane component based on an analysis of the detected object. In addition, it may be desirable to control crane operations based on the determined condition.

SUMMARY

According to one aspect, a crane includes a carrier unit and a superstructure mounted on the carrier unit, the superstructure including a boom. The crane also includes a cable extending from a free end of the boom, a lifting appliance coupled to the cable and suspended from the boom, and an optical detection system. The optical detection system includes an image capture device positioned to have a field of view in which the lifting appliance is disposed, and is configured to capture an image. The optical detection system also includes an optical detection computer having a processor and a computer-readable storage medium, wherein the optical detection computer is configured to detect one or more objects in the captured image, the one or more objects selected from: the lifting appliance, the cable, a load coupled to lifting appliance, an object remote from the crane and a marker. The optical detection computer is also configured to analyze the one or more detected objects, and determine a condition of a crane component based on the analysis of the one or more detected objects.

According to another aspect, a method of determining a condition of a crane component of a crane is provided. The crane includes a carrier unit, a superstructure mounted on the carrier unit and including a boom, a cable extending from a free end of the boom, a lifting appliance coupled to the cable, and an optical detection system. The optical detection system includes an image capture device positioned to have a field of view in which the lifting appliance is disposed, and is configured to capture an image. The optical detection system also includes an optical detection computer having a processor and a computer-readable storage medium. The method includes detecting, with the optical detection computer, one or more objects in the captured image, the one or more objects selected from: the lifting appliance, the cable, a load coupled to the lifting appliance, an object remote from the crane and a marker. The method also includes analyzing, with the optical detection computer, the one or more detected objects, and determining, with the optical detection computer, a condition of the crane component based on the analysis of the one or more detected objects.

According to another aspect, a method of controlling a crane operation is provided. The crane includes a carrier unit, a superstructure mounted on the carrier unit and including a boom, a cable extending from a free end of the boom, a lifting appliance coupled to the cable, and an optical detection system. The optical detection system includes an image capture device positioned to have a field of view in which the lifting appliance is disposed, and is configured to capture an image. The optical detection system also includes an optical detection computer having a processor and a computer-readable storage medium. The method includes detecting, with the optical detection computer, one or more objects in the captured image, the one or more objects selected from: the lifting appliance, the cable, a load coupled to the lifting appliance, an object remote from the crane and a marker. The method also includes analyzing, with the optical detection computer, the one or more detected objects, and determining, with the optical detection computer, a condition of a crane component based on the analysis of the one or more detected objects. The method also includes controlling, with a crane control system, crane operations based on the determined condition.

These and other features and advantages of the present invention will be apparent from the following detailed description, in conjunction with the appended claims.

BRIEF DESCRIPTION OF THE DRAWINGS

FIG. 11 is a side view of a lift crane having the optical detection system of FIG. 4 with multiple image capture devices, according to an embodiment described herein;

DETAILED DESCRIPTION

While the present device is susceptible of embodiment in various forms, there is shown in the figures and will hereinafter be described a presently preferred embodiment with the understanding that the present disclosure is to be considered an exemplification of the device and is not intended to be limited to the specific embodiment illustrated.

Figure 1:
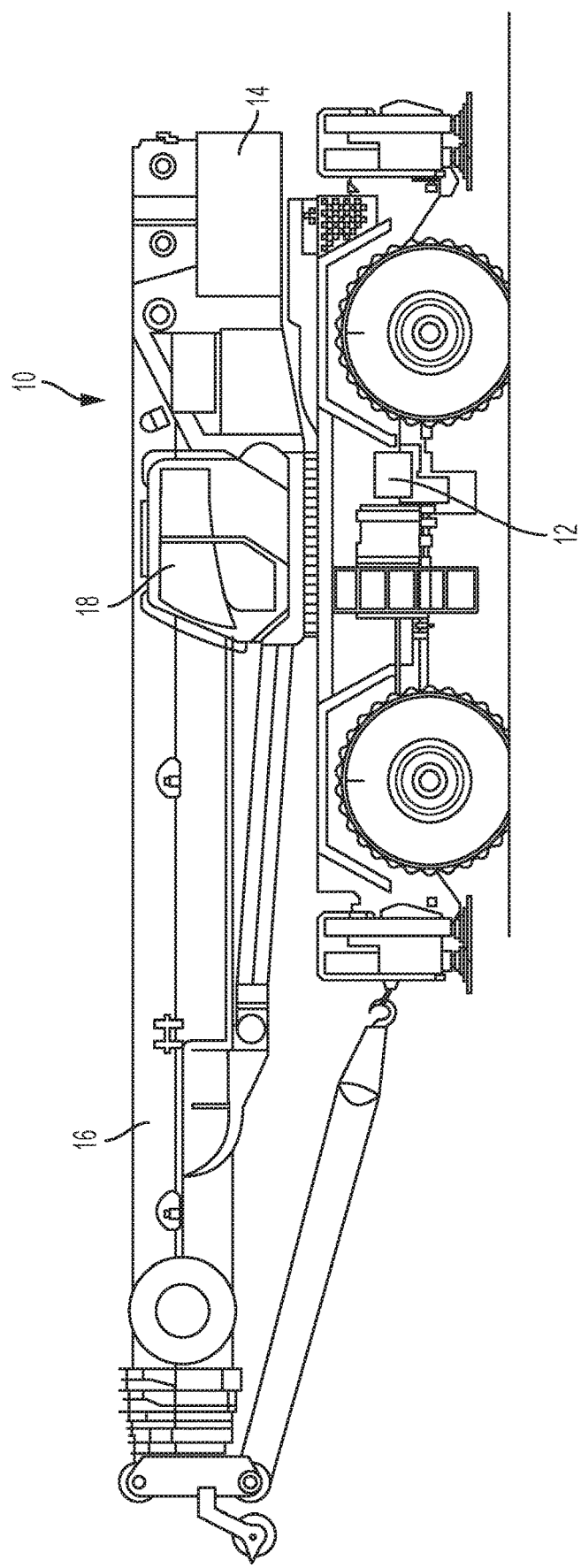
FIG. 1 is a side view of a crane according to an embodiment described herein.

FIG. 1 is a side view of a crane 10. The crane 10 may be, for example, a mobile crane, including, but not limited to, an all terrain crane, a rough terrain crane, industrial crane or a boom truck. The embodiments described herein are not limited to mobile cranes, however. For example, the embodiments of present application may be directed to a crawler crane or tower crane as well.

Referring to FIG. 1, the crane 10 may include a carrier unit 12 having a superstructure 14 supported thereon. In one embodiment, the carrier unit 12 may be a transportable chassis having a plurality of wheels. The superstructure 14 includes a boom 16, including, but not limited to, a telescoping boom 16. The superstructure 14 may also include an operator cab 18. In one embodiment, the superstructure 14 is rotatably mounted on the carrier unit 12. It is understood, however, that in other embodiments, the carrier may be for example, a lower works of a crawler crane having, for example, a continuous track system, or a tower of a tower crane. It is also understood that the superstructure may be, for example, an upper works of a crawler crane including, for example, a lattice boom, or the upper works of a tower crane including a jib assembly.

The crane 10 is configured to carry out a variety of crane operations. In one embodiment, crane operations include telescopic boom extension and retraction (boom out, boom in), boom swing or swiveling (boom left, boom right), boom lifting and lowering (boom up, boom down), and hoist wind up and payout of cable (cable in, cable out). The crane 10 may carry out the crane operations in response to input from an operator. For example, the operator may be situated in the cab 18 and operate various levers, switches, knobs, touch screen controls and the like to control the crane operations. It is understood, however, that the various levers, switches, knobs and the like may be distributed about the lift crane 10, and are not limited to the cab 18.

Figure 2:
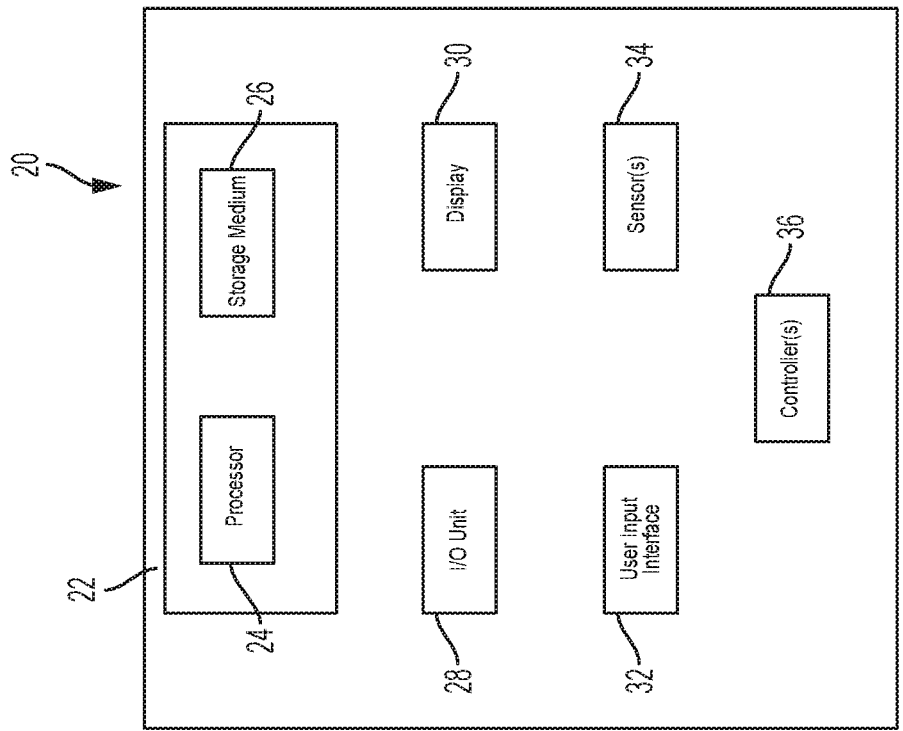
FIG. 2 is a block diagram of a crane control system according to an embodiment described herein.

Referring to FIG. 2, the lift crane 10 optionally includes a crane control system 20 operably connected to various crane components to control the crane operations. For example, the crane control system 20 may be operably connected to the superstructure 14 and control one or more controllers or actuators to control boom swivel operation (i.e., to rotate the superstructure 14 on the carrier unit 12), boom telescoping, boom lifting, and cable wind up and payout.

The crane control system 20 includes a computer 22 having a processor or microprocessor 24, such as a central processing unit (CPU) and/or a graphics-processing unit (GPU). The computer 22 also includes a computer-readable storage medium 26 operably and communicably connected to the processor 24. The computer-readable storage medium 26 is non-transitory and may be, for example, a random-access memory (RAM), read-only memory (ROM), programmable memory, hard disk drive, solid state drive, optical storage media, flash memory or any other type of volatile or non-volatile memory or storage device. The computer-readable storage medium 26 is configured to store program instructions to be implemented by the computer 22 to cause the processor 24 to execute or perform the program instructions and, in one embodiment, to cause the computer 22 to control the various crane operations in response to the execution of the program instructions. In one embodiment, the computer 22 may further include, or be operably and communicably connected to, one or more controllers 36 associated with various crane components for controlling the crane operations. For example, the one or more controllers 36 may control operations of one or more motors for controlling crane operations. In addition, the computer-readable storage medium 26 may be distributed among computer systems connected through a network and computer-readable codes or program instructions may be stored and executed in a decentralized manner.

The crane control system 20 may further include an input/output (I/O) unit 28, a user display 30, such as a display screen via a display adapter, a user input interface 32, which may include one or more controllers and associated user input devices such as a keyboard, mouse, touch screen or pad, microphone, joystick, and the like, and may be closely coupled to the I/O unit 28. In one embodiment, the user input devices 32 and the user display 30 may combined as touch screen display, for example. The crane control system 20 may further include one or more sensors 34 configured to record information about the crane 10 and transmit the information to the computer 22 for processing and/or storage. For example, various sensors 34 disposed at suitable positions on the crane 10 may measure boom length, boom angle, boom swing, hoist operations, loads and pressures using conventional sensors and sensing techniques. The crane control system 20 may also include, or be operably and communicably connected to, one or more of the crane operation controllers 36, for communicating with and controlling the different crane operations described above, but controlling and movement of various crane components. Controlled movements may include stopping, starting, preventing, accelerating or decelerating various components. The various features of the crane control system 20 above may be operably and communicably connected to the computer 22, or implemented as part of the computer 22.

Figure 3:
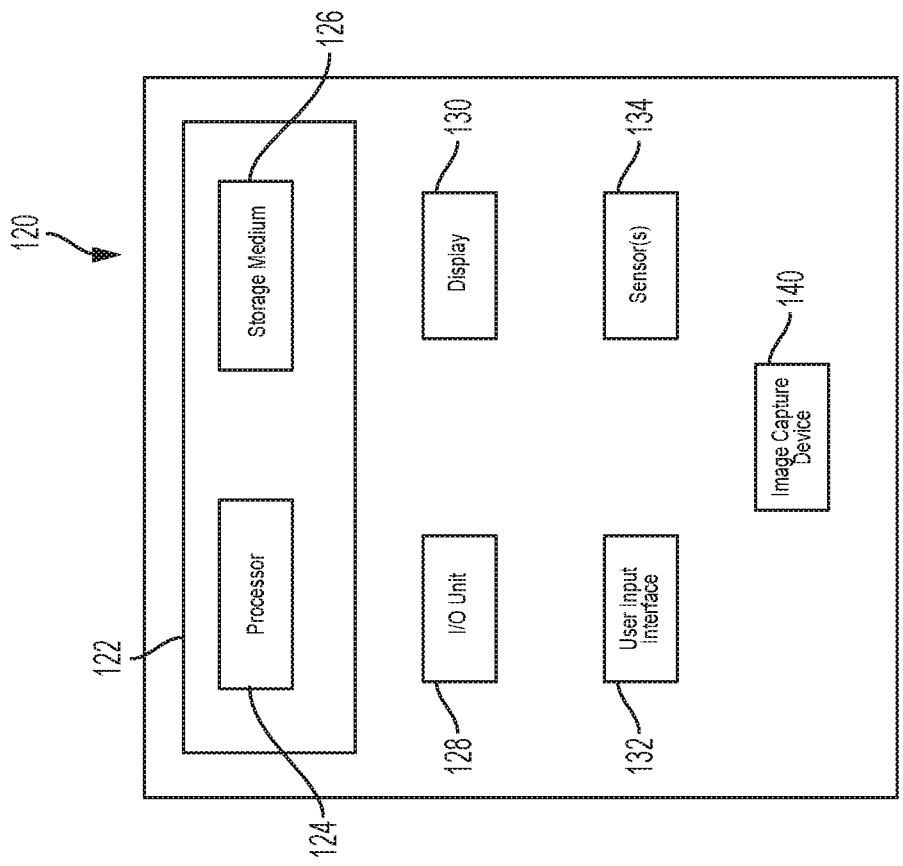
FIG. 3 is a block diagram of an optical detection system according to an embodiment described herein.

Referring to FIG. 3, the crane 10 further includes an optical detection system 120. As described further below, the optical detection system 120 is configured to detect, in a captured image, various objects such as crane components, loads, markers and remotely positioned obstacles or objects in a vicinity of the crane 10. The optical detection system 120 may then analyze the detected object, and based on the analysis of the various objects, determine a status or condition of the detected object and/or a crane component. In one embodiment, as will be described further blow, the crane component may be, for example, one or more of a lifting appliance 38, a cable 40, a load 44 coupled to the lifting appliance 38 (also referred to herein as a loaded lifting appliance 41), and a boom nose or sheave 42. For example, the optical detection system 120 may determine whether a lower lifting appliance 38 is in, not in, or approaching a two-block condition by determining a distance of the lifting appliance 38 from a reference point, whether a suspended load 44 and/or the lifting appliance 38 is in motion and provide information regarding the trajectory of the suspended load 44 or lifting appliance 38, a cable 40 condition, such as frays or other indications of wear or damage, a distance or length of the cable 40 extending from the reference point, a type of cable 40, whether remote objects 46 (see FIG. 9) or obstacles are in an area surrounding the crane 10, a relative position of a crane component and the remote object 46, and a distance from the crane component to the remote object 46. In one embodiment, the reference point from which a distance or length of the cable 40 is measured, and the reference point from which a distance to the lifting appliance 38 may be determined may be, for example, the image capture device 140 or boom nose 42. Other suitable desired crane components or locations to be selected by an operator are envisioned as well.

Figure 4:
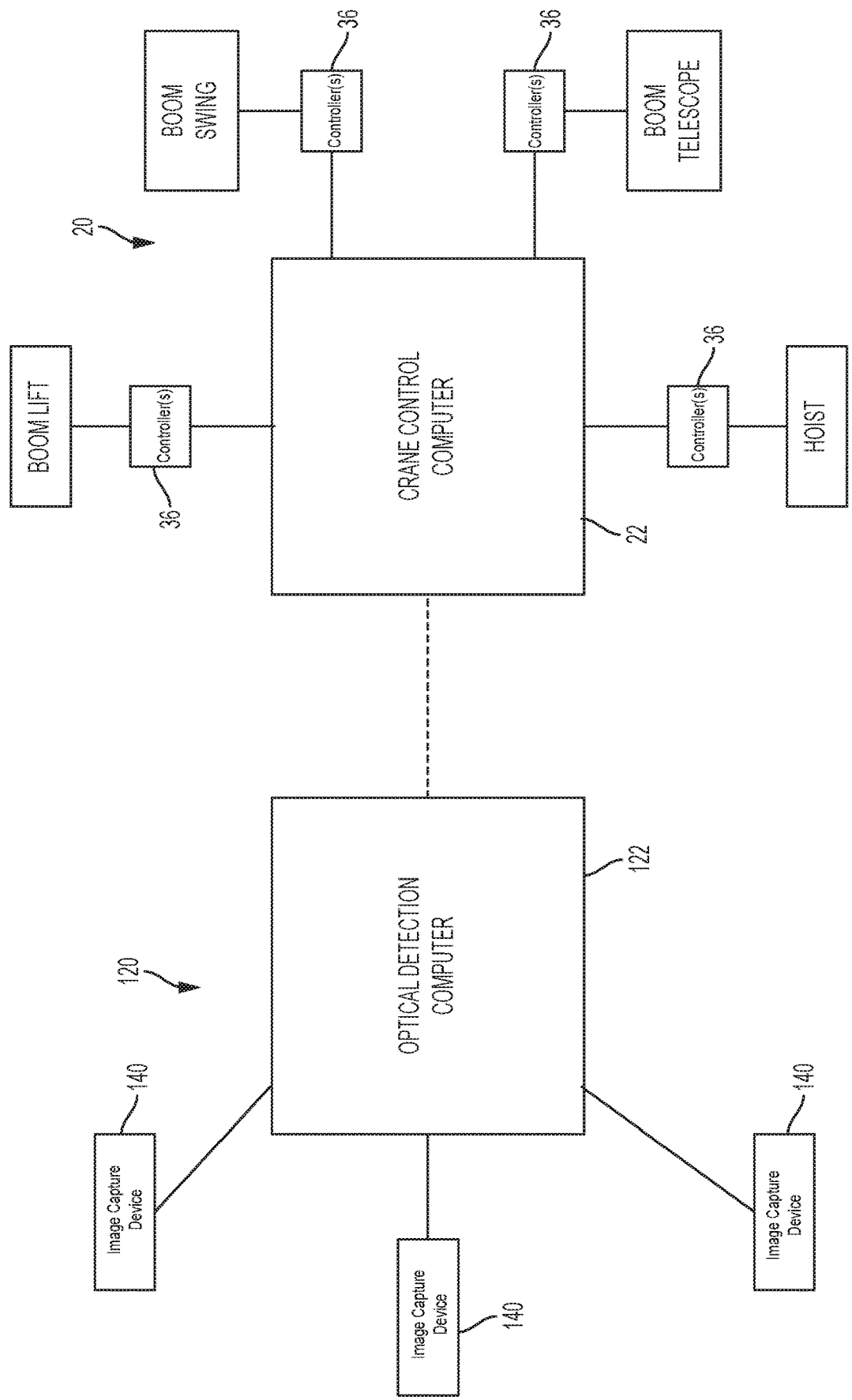
FIG. 4 is a diagram showing the optical detection system and crane control system together according to an embodiment described herein.

Referring to FIG. 4, the optical detection system 120 may also communicate with the crane control system 20 to control the various crane operations in a desired manner, for example, in response to a determined condition or status of a crane component. Alternatively, or in addition, the optical detection system 120 may alert the operator that the various objects have been detected and/or are in motion, or of the condition or status of a crane component or object via an output device, based on the determined condition or status. The alert may be, for example, an audio alert, a visual alert, or a tactile alert, such a vibratory alert.

Referring again to FIG. 3, in one embodiment, the optical detection system 120 includes a computer 122 having a processor or microprocessor 124 and a computer-readable storage medium 126 operably and communicably connected to the processor 124. The processor 124 and computer-readable storage medium 126 may be implemented as devices similar or identical to the processor 24 and computer-readable storage medium 26 described above with respect to the crane control system 20.

The optical detection system 120 may also include an input/output (I/O) unit 128, a user display 130, such as a display screen via a display adapter, a user input interface 132, which may include one or more controllers and associated user input devices such as a keyboard, mouse, touch screen or pad, microphone, joystick, and the like, and may be closely coupled to the I/O unit 128. In one embodiment, the user input devices 132 and the user display 130 may be combined as a touch screen display, for example. The optical detection system 120 may further include one or more sensors 134 configured to record information about the lift crane 10 and transmit the information to the optical detection computer 122 for processing and/or storage. The various features of the optical detection system 120 described herein may be operably and communicably connected to the computer 122, or implemented as part of the computer 122.

Referring again to FIG. 4, in one embodiment, the computer 122 of the optical detection system 120 is configured to communicate with the computer 22 of the crane control system 20 via conventional communication interfaces, such as transceivers and receivers, using conventional communication protocols. Accordingly, information may be electronically communicated between the computers 22, 122 of the crane control system 20 and the optical detection system 120. In another embodiment, the crane control system 20 and optical detection system 120 may share resources. For example, the crane control system 20 and optical detection system 120 may use a common computer, processor, computer-readable storage medium, I/O unit, input device or display. In one embodiment, the optical detection system 120 may be integrated into the crane control system 20 such that they are one and the same. In one embodiment, the sensors 34 described above with respect to the crane control system 20 may alternatively be part of the optical detection system 120, and thus, may be operably and communicably connected to the optical detection system computer 122. Information received from the sensors 34 may be subsequently processed and/or stored by the processor 124 and computer-readable storage medium 126, respectively, of the optical detection system 120.

The optical detection system 120 further includes an image capture device 140 configured to capture images or videos of various objects such as, but not limited to, crane components, loads, markers and remotely positioned obstacles or objects in a vicinity of the crane 10. In one embodiment, an image capture device 140 may be a camera, such as a digital camera, video camera, a stereo camera, a LiDAR sensor, a visible light camera, an ultraviolet (UV) camera, an infrared (IR) camera, and other suitable devices capable of capturing an image or sequence of images for object recognition. In one embodiment, the image capture device 140 is configured with a fixed view and/or dynamic zoom capabilities. The image capture device 140 is operably and communicably connected to the optical detection computer 122 such that images or videos captured by the image capture device 140 are transmitted to the computer 122 and may be stored on the computer readable storage medium 126 for processing by the processor 124. In one embodiment, the image capture device 140 and optical detection computer 122 may be implemented as a unit. Although referred to in the singular, it is understood that the image capture device 140 may also refer one or more of the image capture devices described above connected to one another. For example, the image capture device 140 may include more than one of the image capture devices above to capture an image across a field of view which exceeds the field of view of any individual image capture device 140.

In one embodiment, the optical detection system 120, and in particular, the optical detection computer 122, may detect the various objects in an image captured by an image capture device 140. The optical detection computer 122 may detect one or more of such objects in a captured image using conventional object recognition software, which may be stored in the computer-readable storage medium 126 of the optical detection system 120. The conventional object recognition software may use conventional object detection methods or algorithms understood by those having ordinary skill in the art to detect or differentiate objects in a captured image or video. In one embodiment, the optical detection computer 122 may detect the objects, via the object recognition software, using recognition algorithms such as edge detection using brightness discontinuities. However, the present disclosure is not limited to such a detection technique, and it is understood that other object detection or recognition techniques are envisioned for use with the optical detection system 120 described herein as well. Accordingly, in one embodiment, the optical detection system 120 may detect, in a captured image, edges, shapes, profiles, colors, patterns, and the like, which may correspond to objects captured in the image.

Figure 8:
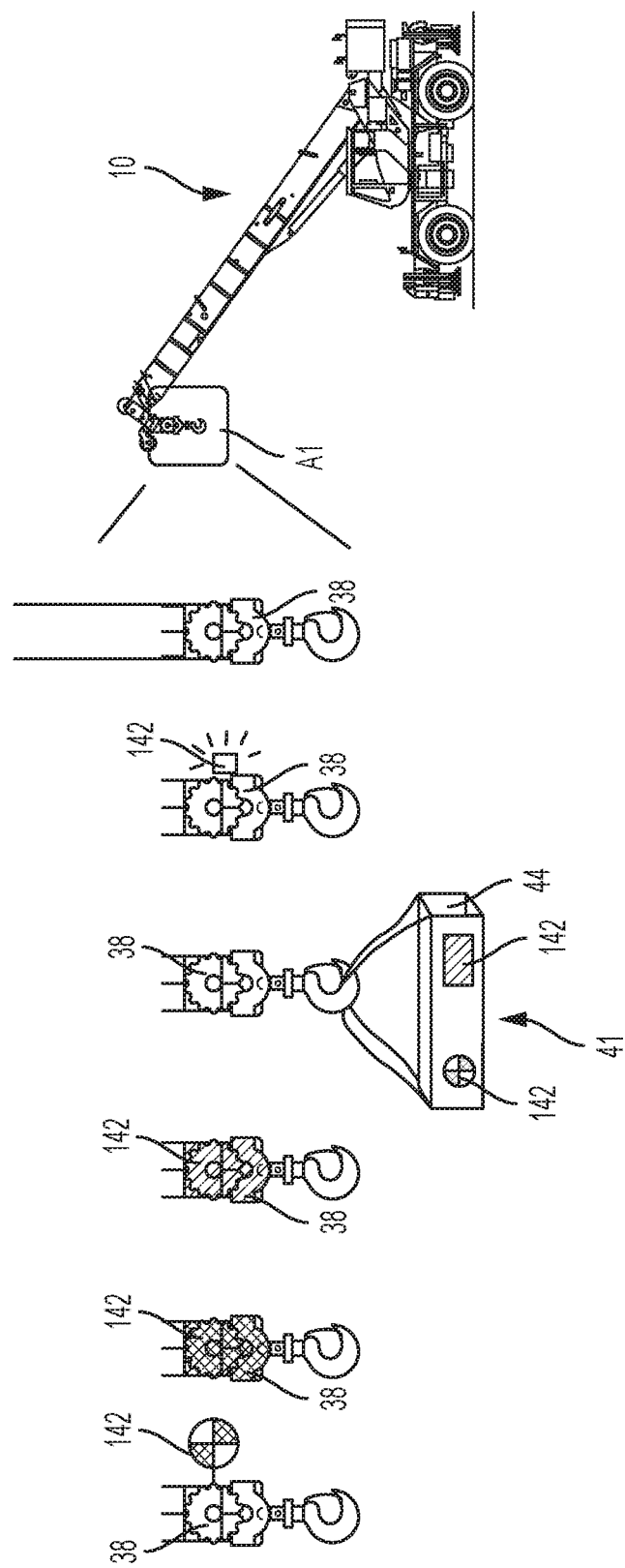
FIG. 8 shows examples of different markers for use with the optical detection system according to embodiments described herein.

In one embodiment, the object detected by the optical detection computer 122 may be the marker 142 or target (see, for example, FIG. 8). Detection of a readily visible marker 142 in the captured image may assist in detection of a crane component or other object on which the marker 142 is disposed. The marker 142 may be, for example, a pattern, such as horizontal or crisscrossing lines, a coating having a particular color to distinguish the object from the background, a specific shape, a light, a specific identifier that is distinguishable from the surroundings, or some combination thereof. For example, the marker 142 may be a fluorescent marker, reflective marker or other highly visible marker to increase contrast relative to the background. The marker 142 may be disposed on an object, such as a crane component, load or remotely positioned object. Accordingly, in some embodiments, by detecting a marker 142, the optical detection system 120 may also detect the object on which the marker 142 is disposed.

Alternatively, or in addition, the optical detection computer 122 may detect an object by way of an analysis of a sequence of captured images taken with respect to time. The sequence of captured images may be compared to one another, and an object may be detected by the optical detection computer 122 by identifying a change in position of, for example, a shape or color identified within the captured images. For example, changes in perception that indicate movement toward or away from the image capture device 140 may indicate the presence of an object. Further, movement across a field of view of the image capture device 140 may indicate the presence of an object. Accordingly, the optical detection computer 122 may detect such an object by in response to the analysis of the sequence of captured images. It is understood, that the object recognition techniques described herein may be used independently or in combination with one another.

The optical detection computer 122 may also analyze objects captured in an image by the image capture device 140. In one embodiment, the optical detection computer 122 analyzes the detected objects described above. The optical detection computer 122 may analyze the objects in the captured image, images or video to, for example, identify a specific object detected in a captured image, identify a position or relative position of a detected object or determine whether an object is moving. In one embodiment, the analysis may include, for example, comparing a captured image to a stored image, comparing a detected object in a captured image to a known object in a stored image, and comparing a detected size, shape or color of an object in a captured image to a size, shape or color of objects in a stored image. The analysis may further include an analysis of a number of pixels extending across a predetermined section of a detected object or between the detected object and a reference point in a captured image, or identifying pixel locations in the captured image in relation to the detected object. The reference point in the captured image may be, for example, a fixed point within the image, a preselected point on the crane within the field of view of the image capture device 140 or another detected object in the captured image. It is understood, that the analyses described are above serve as examples, and that other analyses, including different comparisons between a captured image and a stored image may be carried out by the optical detection computer 122 as well.

In one embodiment, with a position of the image capture device 140 known, the optical detection computer 122 may analyze the detected object to determine a position of the detected object. For example, the optical detection computer 122 may look up a position based on a pixel location of the detected objected, or the pixel location of a selected portion of the detected object. In another embodiment, where an object is detected and determined to be at a particular angle relative to a centerline of the image capture device 140, then a table may give a position corresponding to that particular angle. Further, known geometric and trigonometric functions may be used to determine a position, distance and/or angle of the detected object relative to the image capture device 140 or a crane component (e.g., a boom nose sheave or tip).

In one embodiment, to identify a detected object, the optical detection computer 122 may compare the captured image or the detected object in the captured image to the stored image having known objects therein or a stored image of a known object alone. In one embodiment, one or more of, for example, the shape, size, color or pattern of the detected object may be compared to one or more of the shape, size, color or pattern of the known object. A position of the detected object in the captured image may also be compared to a position of known object in a stored image. If the optical detection computer 122 finds that a detected object matches a stored object, the optical detection computer 122 may then identify the detected object as corresponding to the stored, known object. For example, if a detected object is found to match a stored lifting appliance image, the optical detection computer 122 may identify the detected object as being a lifting appliance. Similarly, if a detected marker 142 is found to match a stored marker, the optical detection computer 122 may identify the detected marker 142 as being a particular known marker.

In one embodiment, a known object in a stored image may have additional information associated therewith stored in the memory 126. Accordingly, when a detected object is identified as corresponding to known object, the additional information may also be associated with the detected, now-identified object. The additional information may include, but is not limited to, product type and identifying information, position information, dimensions, weight, service information, and/or associations with other objects, such as other crane components. For example, a known marker may have additional information associated therewith indicating the known marker is associated with a load 44. The additional information may also include a weight of the load 44. Thus, if a detected marker 142 is identified as corresponding to the known marker, the optical detection computer 122 may then associate the detected marker 142 with a load, identify an object on which the marker 142 is disposed as being a load, retrieve a weight of the load from the memory and/or provide load weight to the crane control system 20.

In one embodiment, to determine if a detected object is in motion, the optical detection computer 122 may analyze sequentially captured images and compare and identify a position of the detected object in each image (for example, by pixel location). Accordingly, a change in the position of the detected object may be detected and it may be determined if the detected object is in motion. From this, the optical detection computer 122 may determine and/or predict a trajectory, direction of movement, velocity and/or acceleration of the object. That is, the optical detection computer 122 may analyze images or frames of a video as a function of time to determine a prior and current state of the object, and predict a continued trajectory or travel path. These determinations may then be communicated to the crane control system 20. As shown in FIG. 4, the crane control system 20 may then carry out corrective or compensatory crane operations by controlling one or more controllers 36 in a desired manner based on the determinations received from the optical detection computer 122.

Figure 5:
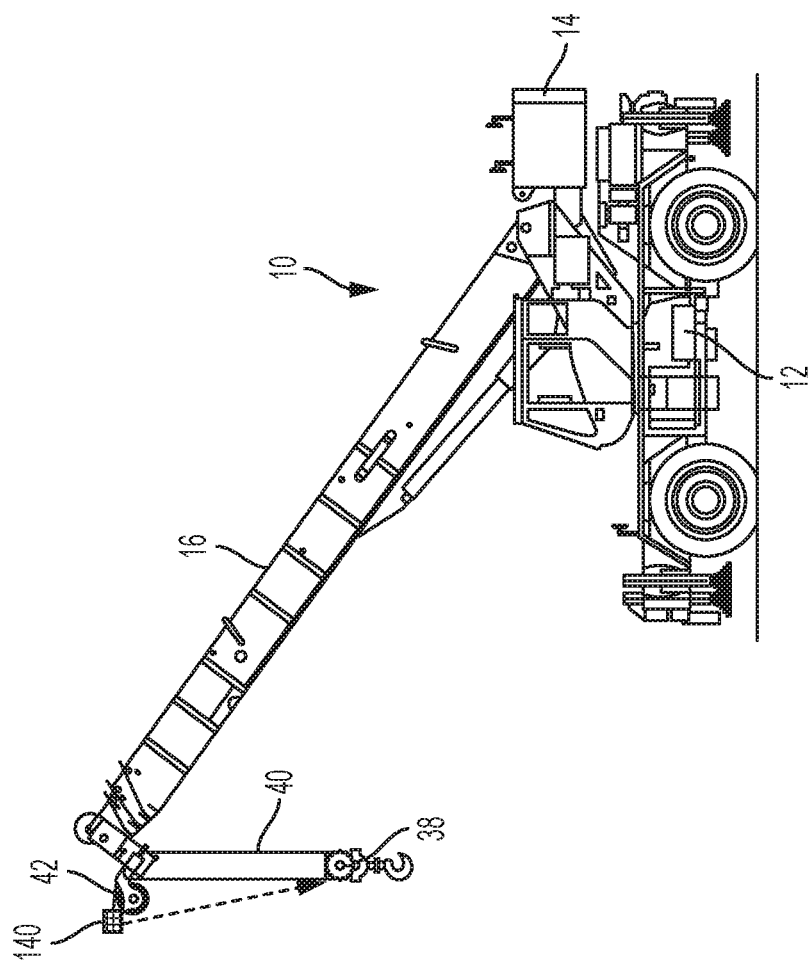
FIG. 5 is a side view of a lift crane having the optical detection system of FIG. 4, according to an embodiment described herein.

In one embodiment, the optical detection computer 122 is configured to determine whether a lower lifting appliance 38, such as a lower hook block, is in, not in, or is approaching a two-block condition (i.e., where the lower lifting appliance comes into contact with an upper lifting appliance or the boom nose 42). Accordingly, the optical detection computer 122 may provide, non-mechanically, anti-two block functionality. For example, as shown in FIG. 5, the crane 10 may include the lifting appliance 38 suspended on the cable 40. The lifting appliance 38, in one embodiment, is configured to engage the load 44 to be lifted. In one embodiment, the image capture device 140 may be mounted at or near the boom nose 42 at a distal end of the boom 16. The image capture device 140 is directed toward the lifting appliance 38 and is configured to capture images in a field view which includes the lifting appliance 38.

Figure 6:
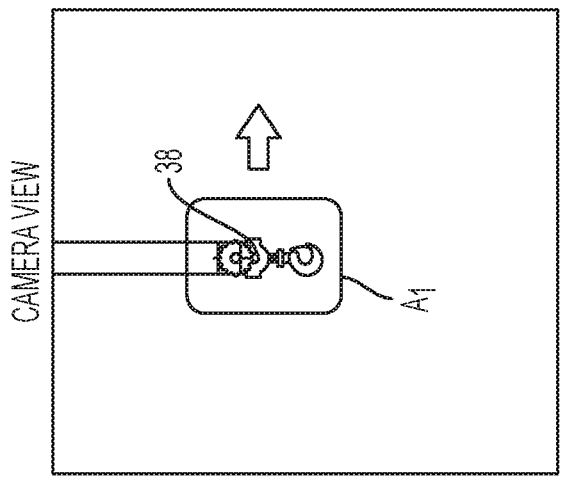
FIG. 6 is a representation of an image captured by the optical detection system and a detected object according to an embodiment described herein.
Figure 7:
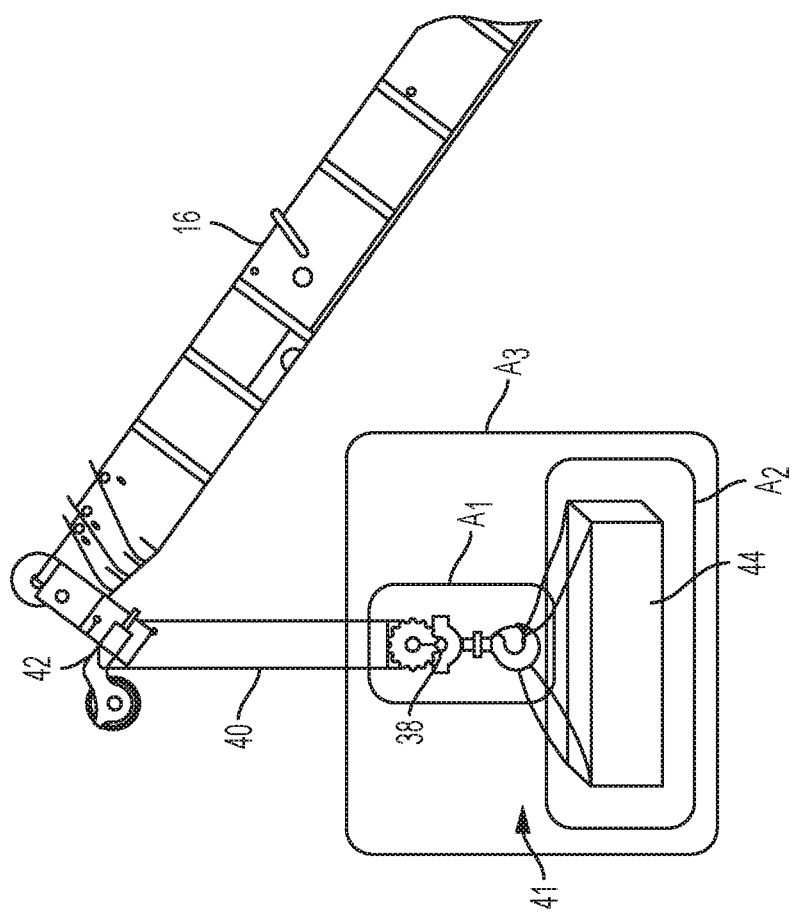
FIG. 7 is representation showing objects detected by the optical detection system according to an embodiment described herein.

FIG. 6 is a representation of an image captured by the image capture device 140. The optical detection computer 122 may analyze the captured image to detect one or more objects in the captured image. For instance, the optical detection computer 122 may detect, in the captured image, the lifting appliance 38, as shown in FIG. 6. In one embodiment, the optical detection computer 122 optionally define an area $A_1, A_2, A_i \ldots$, around the detected object, wherein, further image analysis may be limited to the defined area. Alternatively, or in addition, the optical detection computer 122 may detect the presence of the load 44 connected to the lifting appliance 38 in area $A_2$, and/or the lifting appliance 38 and the load 44 together in area $A_3$, as shown in FIG. 7. It is understood that in one embodiment, with the load 44 coupled to the lifting appliance 38, the lifting appliance 38 and load 44 may be considered to be a single object or crane component, and, as noted above, may be referred to herein the loaded lifting appliance 41.

The image capture device 140, via the optical detection computer 122, may detect the lifting appliance 38 using any of the techniques described above, or other suitable techniques well known to those skilled in the art. For example, an edge recognition algorithm may be applied and/or the lifting appliance 38 may be provided with an easily distinguishable marker 142.

Referring to FIG. 8, different markers 142 may be detected by the optical detection computer 122 in the embodiments described herein. In one embodiment, as detailed above, the marker 142 may be a specific shape, a specific color, a distinguished pattern, a light, a specific identifier that is distinguishable from the surrounding, or some combination thereof, which may be identified by the optical detection computer 122 when analyzing the captured image. The embodiments described herein are not limited to these markers 142, however, and other suitable markers that provide distinguishing indicia which may be captured by the image capture device 140 and recognized by the optical detection computer 122 are envisioned as well.

In one embodiment, one or more markers 142 may also be disposed on an object, such as the load 44, to assist in load detection by the optical detection computer 122. In one embodiment, the optical detection computer 122 may compare known markers stored in the computer-readable storage medium 126 to the captured images, in the manner detailed above. If a marker 142 is found in the captured images that matches one of the stored markers, the optical detection computer 122 may determine that a load is present, for example, via the additional information associated with the known marker. Alternatively, or in addition, as described above, the marker 142, and in turn the object (e.g., the load) may be identified using conventional pattern recognition algorithms.

Further, detection methods described above may be used together, or with other information received from sensors. For example, a pressure sensor may detect the load 44 being supported on the cable 40. This information may be used together with the detection methods above to confirm the presence of a lifting appliance 38 or load 44. Further still, an operator may provide input to the computer 122 to confirm the presence of the lifting appliance 38 and/or the load 44. In addition, the optical detection computer 122 or crane control system 20 may compare information about the load 44, as detected or determined by optical detection system 120, to an expected load or a load detected by the crane control system 20 by way of the pressure sensor or other suitable techniques. In another embodiment, a load detected by the pressure sensor or other suitable technique may be compared to the expected load. The crane control system 20 may provide an alert if the expected load differs from the detected or measured load.

Figure 9:
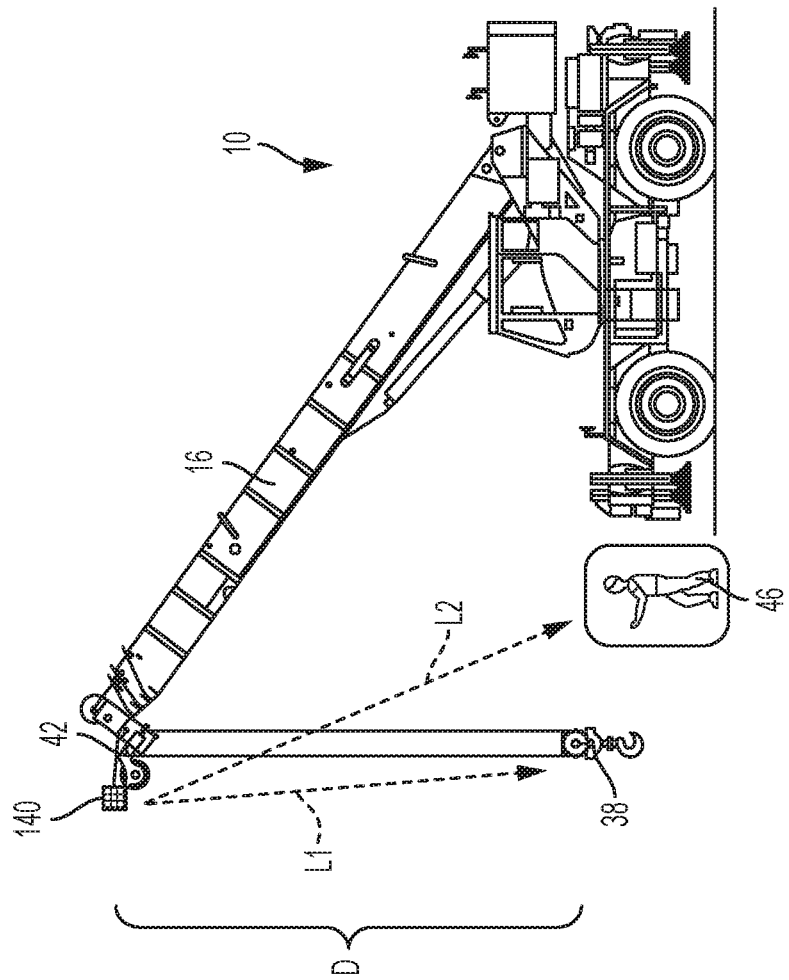
FIG. 9 is a side view of a crane with the optical detection system of FIG. 4, showing lines of sight, according to an embodiment described herein.

FIG. 9 shows an example of objects that may be captured in an image by the image capture device 140. Subsequently, the objects may be detected by the optical detection computer 122 as described above. For example, referring to FIG. 9, as indicated by the lines of sight L1, L2 shown as dashed arrows, the image capture device 140 may capture, in an image, the lifting appliance 38 and another remotely positioned object 46, such as a person, positioned within the field of view of the image capture device 140. The captured image may be analyzed by the optical detection computer 122, and the objects may be detected. For example, the optical detection computer 122 may detect the lifting appliance 38 disposed on the cable 40 and the other object 46, such as a person, disposed in the vicinity of the crane 10.

Figure 10:
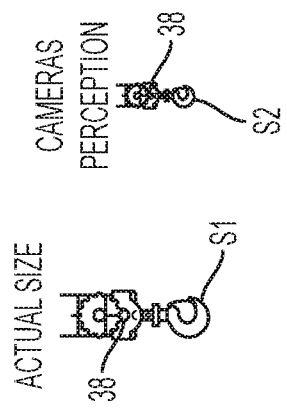
FIG. 10 shows representations of images captured by the optical detection system at different distances, according to an embodiment described herein.

In addition, a distance 'D' between the boom nose 42 and the lifting appliance 38, or other object, may be determined or calculated by the optical detection computer 122. FIG. 10 is a representation of the lifting appliance 38 having a perceived first size in the captured image. The first size S1 may correspond to a size when viewed from a first distance. FIG. 10 also shows a representation of the lifting appliance 38 having a perceived second size S2, as captured in an image by the image capture device 140. The second size S2 corresponds to a size of the lifting appliance 38 when viewed at a second distance. That is, a perception of the size of the lifting appliance 38 is based on the distance the lifting appliance 38 is positioned from the image capture device 140. A ratio between the first size and second size can be used to determine the distance from the image capture device 140. For example, in one embodiment, two distances associated with corresponding known perceived sizes may be input to the crane control system 20, and other distances may be interpolated or extrapolated. In another embodiment, a distance may be calculated assigning a scale corresponding to pixel size, and counting pixels in the captured image. In one embodiment, the distance of the lifting appliance 38 from the image capture device 140 is substantially the same as a distance from the lifting appliance 38 to the boom nose 42. By determining the distance between the lifting application 38 and boom nose 42, an approaching two-block condition may be detected. For example, if the determined distance is less than a stored or input predetermined threshold distance, the optical detection computer 122 may determine that the likelihood of a two-block condition is unsuitably high. Alternatively, or in addition, a comparison of the determined distance to the threshold distance may indicate an approaching two-block condition if the determined distance is moving closer to the threshold distance and is within a predetermined distance of threshold distance. Further, it may be determined that the lifting appliance 38 is not in the two-block condition of the determined distance exceeds the threshold distance by a predetermined amount.

In another embodiment, rather than calculating the distance between the boom tip 42 or image capture device 140 and the lifting appliance 38, the ratio of the first S1 and second sizes S2 may be used by the optical detection computer 122 to determine the proximity or relative distance of the lifting appliance 38 to the boom nose 42 or image capture device 140, as described below. In one embodiment, the first and second sizes S1, S2 may be dimensions at a selected section of the object, for example, a width at a midline of the lifting appliance 38. In one embodiment, the size may be measured, by the optical detection computer 122 for example, as a number of pixels along a line at the selected section of the object in a captured image. In one embodiment, the first size may correspond to a size of the lifting appliance 38 at a threshold distance from the boom tip 42 or image capture device 140, i.e., a minimum acceptable distance from the boom nose 42 or image capture device 140 to the lifting appliance 38. Thus, a ratio of the first size S1 to the second size S1 greater than 1 may indicate that the lifting appliance is not in a two-block condition. When the ratio equals 1, the lifting appliance 38 is determined to be at a threshold distance from the image capture device 140. If the ratio is less than 1, the optical detection computer may determine that the likelihood of two-blocking is undesirably high or a two-blocking condition exists. It is understood that other suitable ratio value may be used to determine whether the lifting appliance is in, not in, or approaching a two-blocking condition.

Other distances may be determined by the perception calculations as well. For example, a distance between spaced apart crane components, objects or a total size or surface area of a top surface of the lifting appliance 38 may also be determined. A distance between a crane component and the remotely positioned object 46 may also be determined.

Referring to FIG. 11, in one embodiment, multiple image capture devices 140 may be positioned on the lift crane 10 at different locations. For example, image capture devices 140 may be positioned along the boom 16, on the cab 18 or at a front end of the carrier unit 12. These image capture devices 140 may be directed toward the lifting appliance 38 and/or load 44 (FIG. 7) to capture images or videos thereof, or directed at different areas, crane components, or objects as desired. In one embodiment, the calculation of a distance between the lifting appliance 38 and boom tip 42 may be carried out based on images captured by the other image capture devices (i.e., those not positioned at the boom tip). The calculations may be carried out, for example, by using the methods described above where different sizes are perceived at different distances from the image capture devices 140. Further, distances measured using images captured from different image capture devices 140 may be cross-checked against the calculated distances based on the images captured by the boom tip image capture device 140 to confirm proper functioning of the system 120.

With a lifting appliance 38 detected, and a distance of the lifting appliance 38 to the boom tip 42, image capture device 140 or other crane component is known, the optical detection system 120 may work in conjunction with the crane control system 20 to prevent or limit the likelihood of the two-blocking condition. For example, the threshold distance may be stored in the computer-readable storage medium 26, 126 of the optical detection system 120 or the crane control system 20. The distance 'D' may be calculated by the optical detection computer 122 at regular time intervals, and subsequently be compared to the stored threshold distance.

When the calculated distance is equal to the threshold distance the crane control system 20 may control crane operations to substantially limit or prevent further movement of the lifting appliance 38 closer to the boom nose 42 or other crane component. For example, the crane control system 20 may control operation of the hoist (not shown) to lock out or prevent further winding or reeling in of the cable 40. The crane control system 20 may also control boom telescoping (i.e., boom extension) that would result in movement of the lifting appliance 38 closer to the boom tip 42. For example, the crane control system 20 may lock out operation of a boom extension operation, such that the operator is prevented from extending the boom 16 when the threshold distance between the lifting appliance 38 and boom tip 42 has been met. Alternatively, or in addition, the crane operator may be alerted of the detected condition through one or more of the alerts discussed above.

The crane control system 20 may also take corrective or compensatory action when the threshold distance between the lifting appliance 38 and the boom tip 42 has been met or is being approached. For example, the crane control system 20 may control the hoist to cause the hoist to payout a predetermined length of cable 40, or the telescoping boom 16 to retract a predetermined distance to maintain the threshold distance. Corrective actions may be determined, for example, based on whether or not a load is affixed to the lifting appliance 38. Although the examples above refer to the threshold distance, it is understood that these examples may also be applied to the embodiment above where a relative distance is determined based on the ratio of perceived sizes S1, S2.

In one embodiment, as noted above, the detected object may be a remote object 46 positioned remotely from the crane 10, but still within the field of view of an image captured device 140. Such an object may be, for example, work equipment, supplies, personnel, or other objects typically found at a worksite. In one embodiment a load 44 that is not coupled to the lifting appliance 38 may be the remote object 46 as well. The optical detection computer 122 may analyze the remote object 46 and determine a position of the remote object 46 relative to the crane 10, and in one embodiment, relative to a crane component. The relative position may be, for example, a distance from a particular crane component, such as the lifting appliance 38, cable 40, or loaded lifting appliance 41, or image capture device 140, and may be determined, for example, by an analysis of pixels in the captured image with the optical detection computer 122. A table stored in the optical detection system 120 may include scale information, for example, relating to each pixel in a captured image. The scale information may vary depending on a position of the image capture device 140. Distances may be calculated geometrically as well, with necessary position data input to the crane control system 20.

In another embodiment, the optical detection computer 122 may monitor a position of a detected object, such as a crane component, relative to the remote object 46. The crane control system 20 may control operation of one or more crane components based on the position or distance of the remote object 46 relative to the one or more crane components. For example, the crane control system 20 may prevent operation of a crane component which would move the crane component within a predetermined distance from the remote object 46. In one embodiment, the crane control system 20 may control a crane component to move away from the remote object 46. However, in another embodiment, if the remote object 46 is identified as an uncoupled load 44, for example, by the optical control computer 122 or user input, the crane control system 20 may control operation of the crane components to position the components near the uncoupled load 44 for coupling to the lifting appliance 38, or away from the uncoupled load 44, after detaching the load 44 from the lifting appliance 38.

Figure 13:
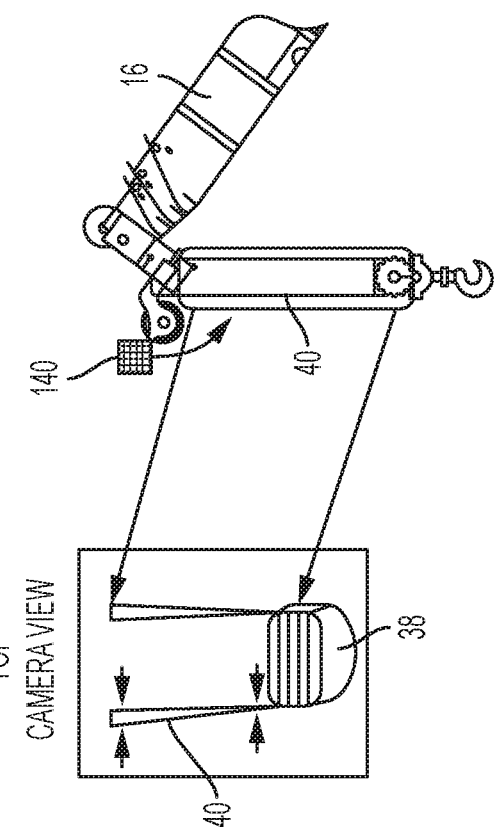
FIG. 13 is a top view representation of an image captured by the optical detection system, according to an embodiment described herein.
Figure 12:
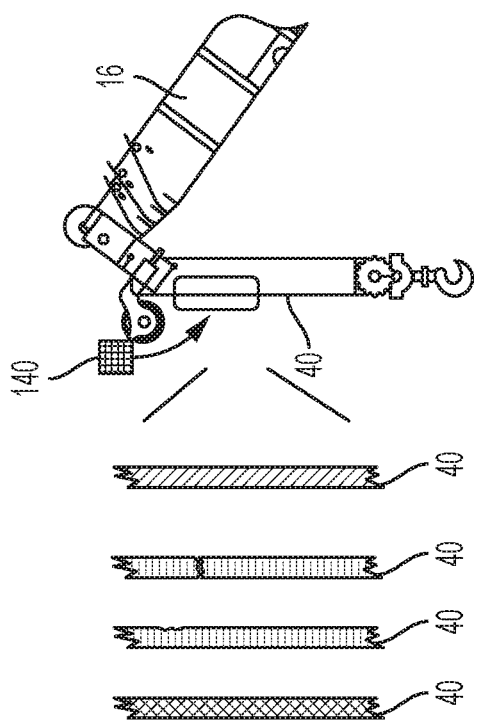
FIG. 12 is a representation of different cables captured in an image by the optical detection system, according to an embodiment described herein.

FIG. 12 is a representation of images captured by the image capture device 140 showing different cable types, according to an embodiment described herein. FIG. 13 is a representation of an image captured by the image capture device 140 of the lift appliance 38 on the cable 40 from the perspective of the image capture device 140 mounted at or near the boom nose 42, according to an embodiment described herein.

Referring to FIGS. 12 and 13, the optical detection system 120 may capture and analyze images of the cable 40 to, for example, determine a type, a size and a condition of the cable or rope. Captured images of the cable 40 may be analyzed by the computer 122. The type of cable 40 may be determined, for example, by comparing the captured image to stored images of known types of cable. Alternatively, or in addition, an image of the cable 40 may be displayed to the operator for inspection or confirmation via the display 30, 130. The cable 40 may be, for example, a metal cable, a rope, synthetic media, suspension means or other suitable lifting media.

Different types of cables 40 may have different operating parameters stored in the computer 22, 122 of the crane control system 20 and/or optical detection system 120. For example, a first type of cable 40 may be associated with a first load limit, while a second type of cable 40 may associated with a second load limit. The detected cable 40 may be analyzed by the optical detection computer 122 to identify the detected cable as corresponding to a known cable. The different operating parameters of the known cable may then be associated with the detected cable 40.

Accordingly, the crane control system 20 may control crane operations based on the load limit associated with the detected type of cable 40. For example, if a load affixed to the lifting appliance 38 is determined to exceed a load limit associated with the detected cable 40, the crane control system 20 may lock out further winding up of the cable 40 by the hoist so that the load 44 is not lifted. Similarly, a boom up or boom extend operation may be locked out by the crane control system 20 to prevent lifting of the load 44. Other conventional methods for determining the cable type using object recognition techniques may be used as well.

Further, the optical detection computer 122 may analyze captured images of the cable 40 to detect, for example, frays, imperfections or other cable conditions that may negatively affect performance of the cable 40. The cable condition may be detected, for example, by the computer 122 comparing the captured images of the detected cable 40 to stored images of cables in suitable or preferred conditions for operating. Conventional methods using object recognition techniques may be implemented as well. If a cable 40 is determined by the optical detection computer 122 to have frays, imperfections and the like, such a determination may be communicated to the crane control system 20 and the crane control system 20 may lock out crane operations that would be impacted by the frayed or imperfect cable 40. For example, a wind up operation of the hoist, boom up and boom extend operations may be locked out.

In addition, object detection of the cable 40 may be used by the optical detection computer 122 to determine the distance between the lifting appliance 38 and boom tip 42. For example, referring to FIG. 13, the optical detection computer 122 may detect different cable diameters or thicknesses at different distances from the image capture device 140. That is, for example, from a top view, images of the cable 40 captured by the image capture device 140 may show the cable 40 having a greater diameter or thickness at a position near the image capture device 140, for example, at or near the boom nose 42, and a reduced diameter or thickness at another position further from the image capture device 140, for example, at the lifting appliance 38. A ratio of the thicknesses or diameters may be used to calculate a distance or relative distance of the lifting appliance 38 to the boom tip 42, with certain known information, such a relationship of a change in perceived diameter or thickness with distance. This calculated distance may be compared to a threshold distance between the lifting appliance 38 and boom nose 42 or image capture device 140 as described above to prevent or reduce likelihood of a two-block condition.

Figure 14:
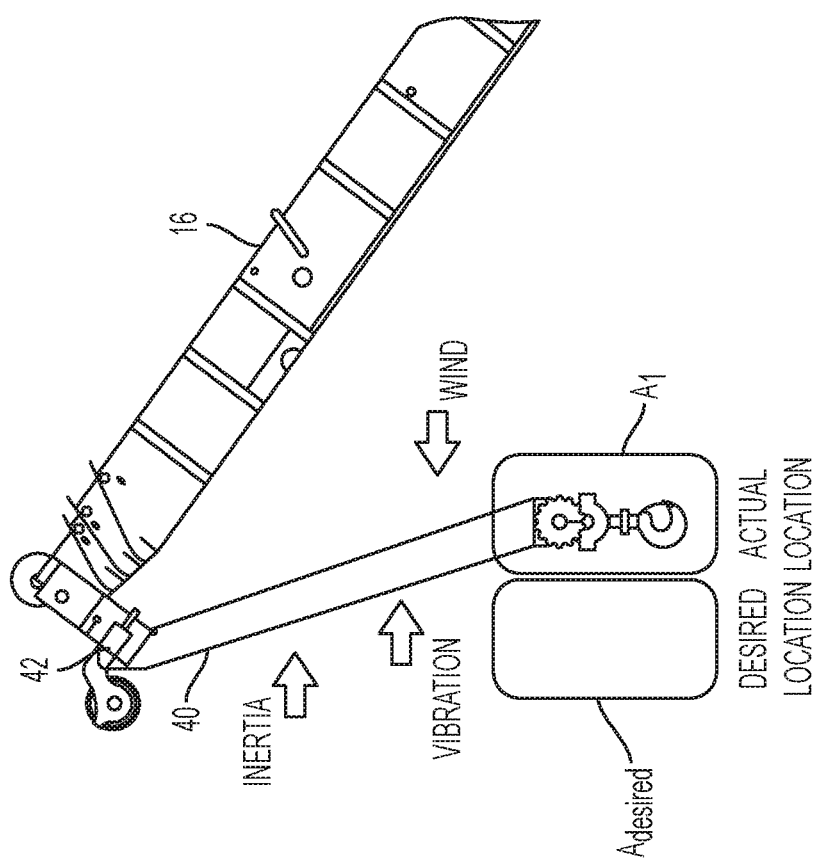
FIG. 14 is a side view showing a lifting appliance in a swaying or swinging condition, according to an embodiment described herein.

FIG. 14 shows an example of the lifting appliance 38 and the cable 40 in a swinging condition. Various factors may cause the lifting appliance 38 to swing, such as inertia, gravity, wind or boom movement. In one embodiment, as described above, the optical detection computer 122 may analyze a detected object in a series of captured images to determine whether the object is moving. Accordingly, in one embodiment, the optical detection computer is also configured to detect, for example, a swinging lifting appliance 38 and/or load affixed to the lifting appliance 38. In one embodiment, a desired or expected location $A_{desired}$ may be compared to the actual location A1 of the detected object, such as the lifting appliance 38, to determine if the detected object is swinging.

The optical detection computer 122, according to an embodiment described herein, is configured to analyze a trajectory of the lifting appliance 38 or loaded lifting appliance 41 at any given time. In one embodiment, to determine a trajectory of the lifting appliance 38, the computer 122, using the object recognition techniques described above, carries out a comparison of previously captured images of the lifting appliance 38 to a current or most recent image of lifting appliance 38. The computer 122 identifies the object, i.e., the lifting apparatus 38, and determines motion of the lifting apparatus 38 based on a position of the lifting apparatus 38 with respect to time. Accordingly, the computer 122 may calculate velocity and acceleration over a given time period, the direction of movement of the lifting appliance 38, and its current vector. Similar calculations may be made for a swinging loaded lifting appliance 41 or other moving objects detected in a captured image by the optical detection computer 122. Such information may be output to a display unit 30, 130 for viewing by the operator.

Figure 15:
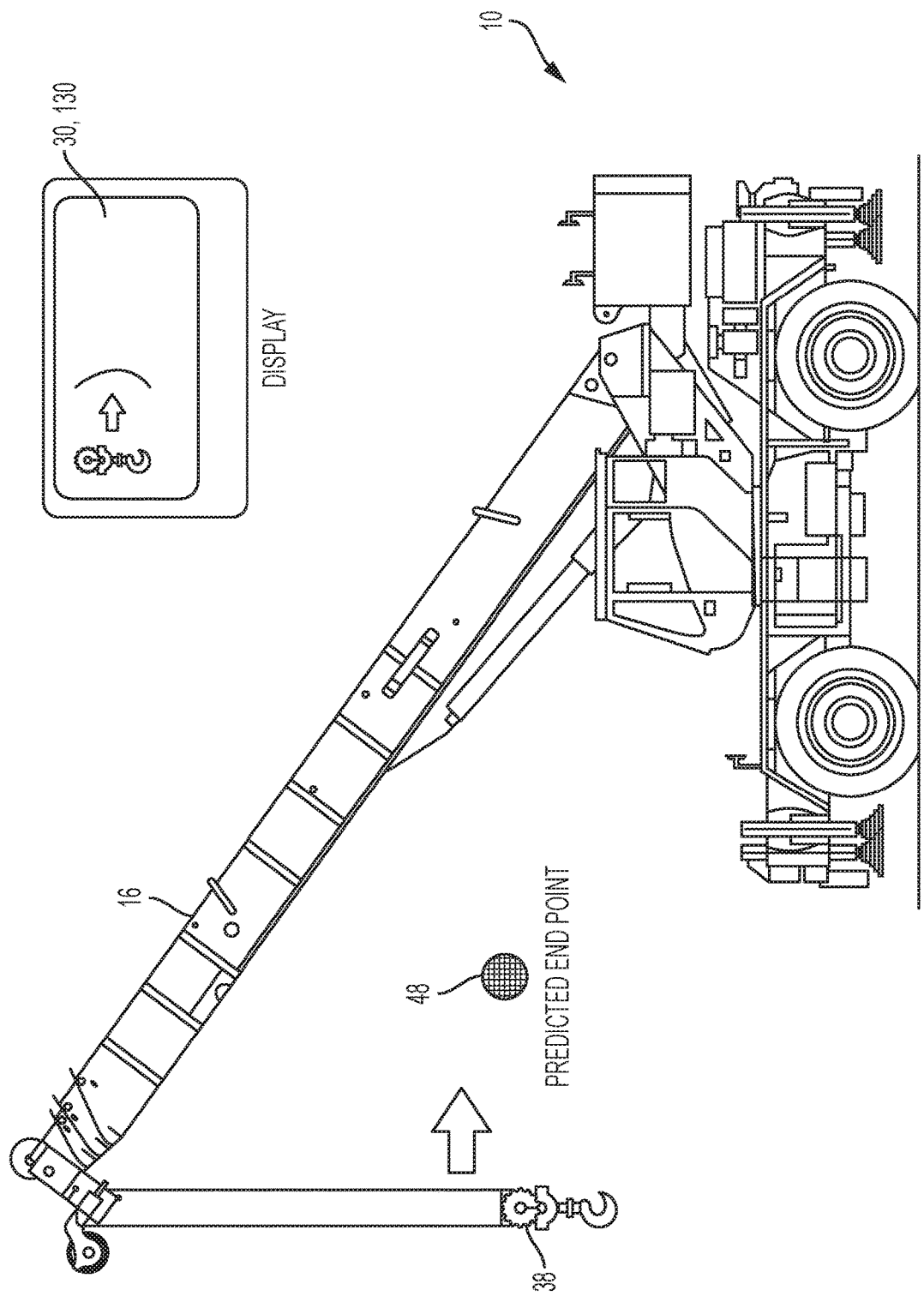
FIG. 15 is a side view showing an example of an end point calculation and display for a swinging lifting appliance, according to an embodiment described herein.

Referring to FIG. 15, the optical detection computer 122 may also predict an end point 48 of a swing path of the lifting appliance 38 and/or load 44. For example, the optical detection computer 122 may consider a swinging lifting appliance 38 or load 44 to move as a pendulum. Distance, acceleration and velocity of the lifting appliance 38 or load 44 may be determined as detailed above. A predicted end point 48 of the swinging lifting appliance 38 or load 44 may then be determined by the optical detection computer 122 based on the distance, acceleration and velocity. The velocity may be calculated, for example, by measuring horizontal displacement of the lifting appliance 38 or load 44 over time using the object recognition methods described above. The predicted end point 48 may be output to the display 30, 130 for viewing by the operator. The trajectory and end point analyses described above may be useful, for example, in confined work spaces to assist in avoiding collisions.

In one embodiment, the optical detection computer 122 communicates the trajectory and predicted end point information to the crane control system 20, and the crane control system 20 may control various crane operations to compensate for the swinging motion of the lifting appliance 38. For example, the crane control system 20 may operate the boom 16 to extend or swivel in response to the trajectory and predicted end point information 48. The operator may turn this crane control system 20 functionality on or off as desired. Other crane components may be controlled by the crane control system 20 to move or stop moving in a manner which reduces swinging of the lifting appliance 38 or load 44.

Figure 16:
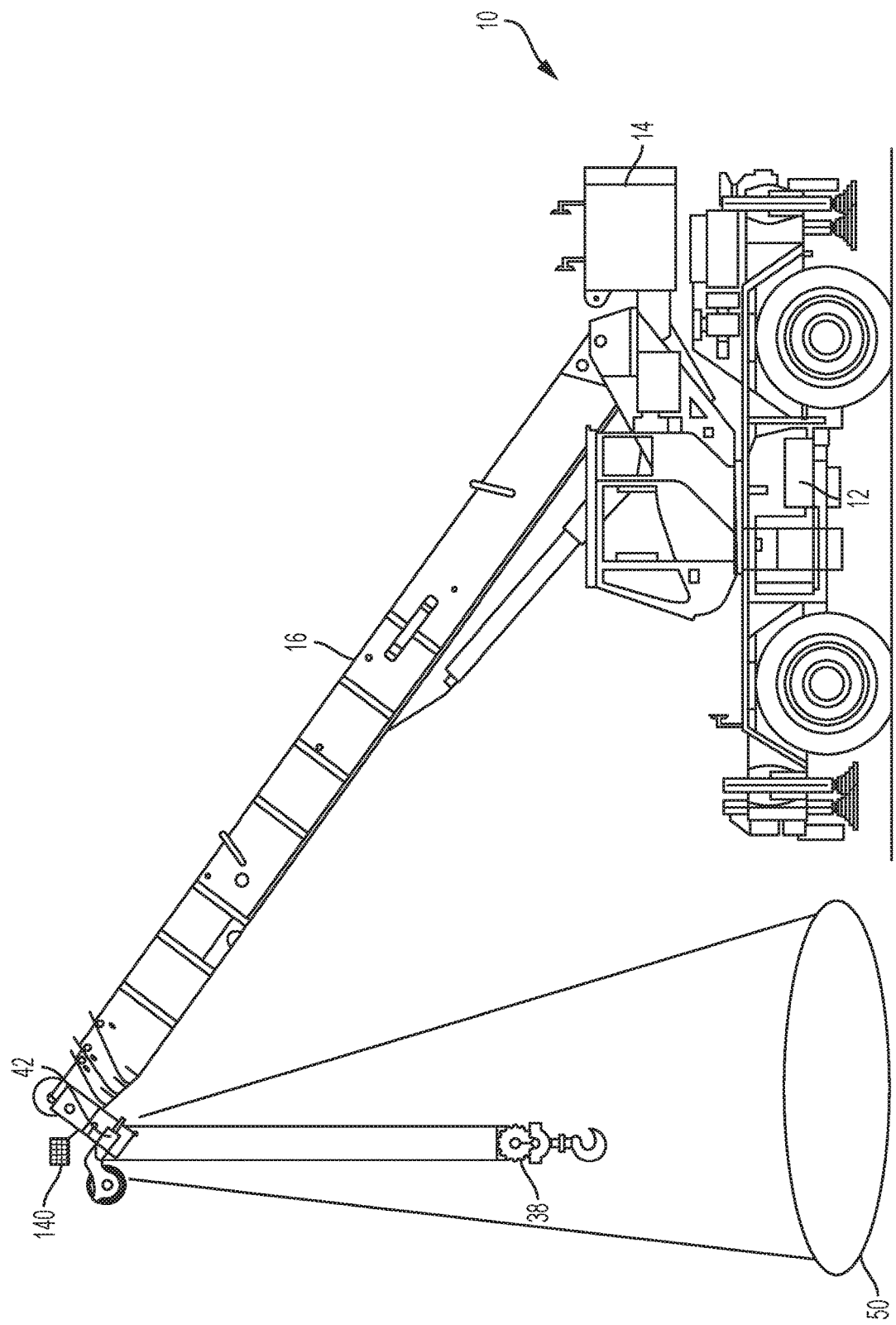
FIG. 16 shows a desired operation zone of the optical detection system, according to an embodiment described herein.

Referring to FIG. 16, the optical detection computer 122 may also set a zone of operation 50. The zone of operation 50 may be a field of view of one of the image capture devices 140, for example, the image capture device 140 mounted at or near the boom nose 42. In one embodiment, the zone of operation 50 defines an optimal area for swinging of the lifting appliance 38 or the loaded lifting appliance 41 to be restricted to. The optical detection computer 122 may detect swinging of the lifting appliance 38 or the loaded lifting appliance 41 as described in the embodiments above. The optical detection computer 122 may further predict the end point 48 of the swinging object as described above. Accordingly, the optical detection computer 122 may compare an actual position of the swinging lifting appliance 38 or loaded lifting appliance 41, or a predicted end point 48 of the swinging lifting appliance 38 or loaded lifting appliance 41, to the boundaries of the zone of operation 50. If the swinging lifting appliance 38 or loaded lifting appliance 41 extends outside of the boundaries, or is predicted to extend outside of the boundaries, the crane control system 20 may control crane operations, such as boom length, hoist, or boom swing, to reduce the swinging motion. Alternatively, or in addition, the optical detection system 120 or the crane control system 20 may alert the operator of such a condition.

Figure 17:
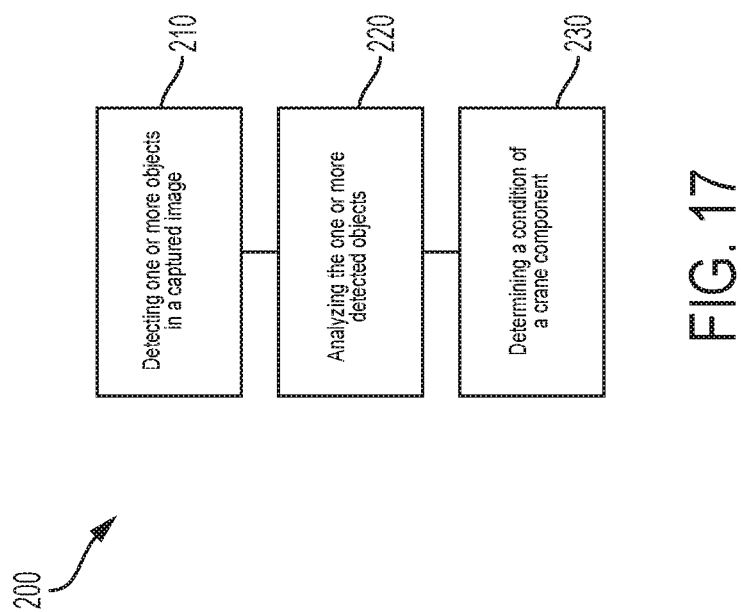
FIG. 17 is a block diagram showing a method of determining a condition of a crane component, according to an embodiment described herein.

FIG. 17 is a block diagram showing a method 200 of determining a condition of a crane component, according to an embodiment. The method includes detecting 210, with the optical detection computer 122, one or more objects in the captured image, the one or more objects selected from: the lifting appliance 38, the cable 40, a load 44 coupled to lifting appliance 38, an object 46 remote from the crane and a marker 142. The method also includes analyzing 220, with the optical detection computer 122, the one or more detected objects, and determining 230, with the optical detection computer 122, a condition of a crane component based on the analysis of the one or more detected objects.

Figure 18:
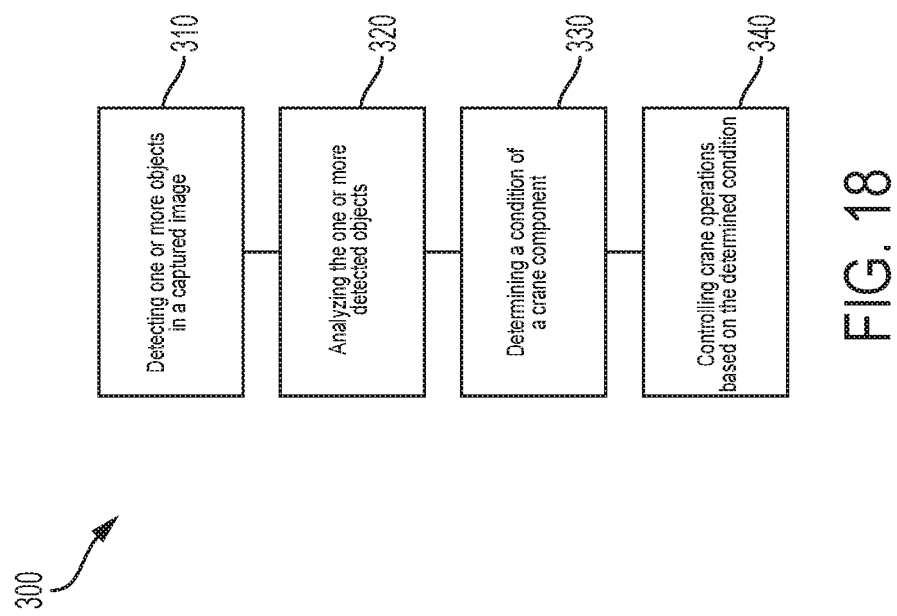
FIG. 18 is a block diagram showing a method of controlling crane operation, according to an embodiment described herein.

FIG. 18 is a block diagram showing a method 300 of controlling crane operation. The method includes detecting 310, with the optical detection computer 122, one or more objects in the captured image, the one or more objects selected from: the lifting appliance 38, the cable 40, a load 44 coupled to the lifting appliance 38, an object 46 remote from the crane and a marker 142. The method also includes analyzing 320, with the optical detection computer 122, the one or more detected objects, determining 330, with the optical detection computer 122, a condition of a crane component based on the analysis of the one or more detected objects, and controlling 340, with the crane control system 20, crane operations based on the determined condition.

In the embodiments above, the optical detection system 120 may either be separate from, or integrated with, the crane control system 20. In one embodiment, the optical detection system 120 is a stand-alone system configured to alert the operator of the detected objects and conditions, for example, via the display 130. In an embodiment where the optical detection system 120 is integrated with, or operably and communicably connected to, the crane control system 20, the crane control system 20 may control various crane operations in response to the output of the optical detection system 120.

It is also envisioned that additional computational power may be included in the optical detection system and/or the crane control system, compared to conventional crane computers. Accordingly, one or more higher powered, or additional, microcontrollers, microprocessors, electronic control units or other processing means may be incorporated into the systems.

Although certain processes, methods, analyses, calculations and/or determinations described herein may be referred as being carried out at one of the crane control system 20 or the optical detection system 120 (including the optical detection computer 122), it is understood that the present embodiments are not limited to these configurations. That is, the processes, methods, analyses, calculations and/or determinations described herein may, in some embodiments, be carried out interchangeably between, i.e., by either one of or both, the crane control system 20 and the optical detection system 120, even if a particular process, method, analysis, calculation or determination is not expressly described as such herein. Similarly, it is also understood that information, such as component specifications, sensor data and the like may be interchangeably input into either the crane control system 20 or the optical detection system 120.

For the purposes of consistency and understanding, the various methods, processes, analyses, calculations or determinations, as well as the input of various data or information, may be described herein as being carried out by, or input to, the optical detection system 120 or optical detection computer 122. However, as detailed above, the optical detection system 120 and the crane control system 20 may share resources or components, operate interchangeably, or be one and the same. Accordingly, it is understood that the description herein of the methods, processes, analyses, calculations, determinations, including the input of data or information, being carried out by or input into the optical detection system 120 or optical detection computer 122, includes such processes, methods, analyses, calculations, determinations, or input of data or information, being carried out by or input into, the crane control system 20 as well.

Further, it is understood that the systems described herein are powered systems. In addition, communications between various components described above may be either wired or wireless.

In the embodiments above, it is understood that the term "lifting appliance" or "hook block" does not limit the present disclosure solely to devices for engaging and lifting a load. Rather, these terms also include, for example, wrecking balls, clamshell buckets and other similar end effectors suspended by cable.

It is understood the various features from any of the embodiments above are usable together with the other embodiments described herein.

All patents referred to herein, are hereby incorporated herein by reference, whether or not specifically done so within the text of this disclosure.

In the present disclosure, the words "a" or "an" are to be taken to include both the singular and the plural. Conversely, any reference to plural items shall, where appropriate, include the singular.

From the foregoing it will be observed that numerous modifications and variations can be effectuated without departing from the true spirit and scope of the novel concepts of the present disclosure. It is to be understood that no limitation with respect to the specific embodiments illustrated is intended or should be inferred. The disclosure is intended to cover all such modifications as fall within the scope of the claims.

What is claimed is:

1. A crane comprising:
    a carrier unit;
    a superstructure mounted on the carrier unit, the superstructure including a boom;
    a cable extending from a free end of the boom;
    a lifting appliance coupled to the cable and suspended from the boom; and
    an optical detection system comprising:
        an image capture device mounted on the superstructure and positioned to have a field of view in which the lifting appliance is disposed, and configured to capture an image; and
        an optical detection computer comprising a processor and a computer-readable storage medium, wherein the optical detection computer is configured to:
            detect one or more objects in the captured image, the one or more objects selected from: the lifting appliance, the cable, a load coupled to the lifting appliance, an object remote from the crane and a marker;
            analyze the one or more detected objects; and
            determine a condition of a crane component based on the analysis of the one or more detected objects.

2. The crane of claim 1, wherein the image capture device includes a camera.

3. The crane of claim 1, wherein the determined condition for the crane component includes one or more of: a two-block condition, an absence of a two-block condition, an approaching two-block condition, swinging motion of the crane component, cable condition, cable type, length of the cable, distance of the lifting appliance from a reference point, a relative position of the crane component to the remote object, and a distance between the crane component and the remote object.

4. The crane of claim 3, wherein the determined condition of a swinging motion of the crane component further includes a determined trajectory of the swinging motion of the crane component.

5. The crane of claim 4, wherein the determined trajectory of the swinging motion of the crane component includes a predicted end point of motion of the crane component.

6. The crane of claim 1, wherein the crane component for which a condition is determined is one or more of: the lifting appliance, the lifting appliance coupled to the load, and the cable.

7. The crane of claim 1, wherein the optical detection computer analyzes the detected object to identify one or more of: the detected object as corresponding to a known object, a position of the detected object, a number of pixels in the captured image extended across a predetermined section of the detected object or between the detected object and a predetermined reference point, and pixel locations within the captured image relative to the detected object.

8. The crane of claim 7, wherein the known object includes additional information associated therewith stored in the computer readable storage medium.

9. The crane of claim 8, wherein the additional information is associated with the detected object upon identifying the detected object as corresponding to the known object.

10. The crane of claim 9, wherein the detected object is a marker disposed on the crane component.

11. The crane of claim 1, further comprising a crane control system operably coupled to the optical detection system, the crane control system configured to control crane operations.

12. The crane of claim 11, wherein the crane control system is configured to control crane operations in response to the determined condition of the crane component.

13. The crane of claim 11, wherein the optical detection system further determines a zone of operation, a trajectory of a swinging crane component and an end point of motion of the swinging crane component, wherein crane control system is configured to control crane operations based on one or more of the zone of operation, the trajectory and the end point of motion.

14. The crane of claim 1, further comprising a display configured to display the determined condition of the crane component to an operator.

15. A method of determining a condition of a crane component of a crane, the crane comprising a carrier unit, a superstructure mounted on the carrier unit and including a boom, a cable extending from a free end of the boom, a lifting appliance coupled to the cable, and an optical detection system comprising an image capture device mounted on the superstructure and positioned to have a field of view in which the lifting appliance is disposed, and configured to capture an image, and an optical detection computer comprising a processor and a computer-readable storage medium, the method comprising:
  detecting, with the optical detection computer, one or more objects in the captured image, the one or more objects selected from: the lifting appliance, the cable, a load coupled to lifting appliance, an object remote from the crane and a marker;
  analyzing, with the optical detection computer, the one or more detected objects; and
  determining, with the optical detection computer, a condition of a crane component based on the analysis of the one or more detected objects.

16. The method of claim 15, wherein the analyzing step further comprises identifying the detected object as the lifting appliance or the load coupled to the lifting appliance, and the determining step further comprises determining a distance between the identified detected object and a reference point.

17. The method of claim 16, wherein the determining step further comprises determining a two-block condition, an approaching two-block condition or an absence of a two-block condition.

18. The method of claim 15, wherein the analyzing step further comprises identifying the detected object as the cable, and the determining step further comprises determining one or more of a cable condition, a cable type or a length of cable.

19. The method of claim 15, wherein the analyzing step further comprises identifying the detected object as a remote object and the determining step further comprises determining one or more of a distance of the crane component to the remote object or a position of the crane component relative to the remote object.

20. A method of controlling a crane operation, the crane comprising a carrier unit, a superstructure mounted on the carrier unit and including a boom, a cable extending from a free end of the boom, a lifting appliance coupled to the cable, an optical detection system comprising an image capture device mounted on the superstructure and positioned to have a field of view in which the lifting appliance is disposed, and configured to capture an image, and an optical detection computer comprising a processor and a computer-readable storage medium, and a crane control system operably coupled to the optical detection system, the method comprising:
  detecting, with the optical detection computer, one or more objects in the captured image, the one or more objects selected from: the lifting appliance, the cable, a load coupled to lifting appliance, an object remote from the crane and a marker;
  analyzing, with the optical detection computer, the one or more detected objects;
  determining, with the optical detection computer, a condition of a crane component based on the analysis of the one or more detected objects; and
  controlling, with the crane control system, a crane operation based on the determined condition.

* * * * *